US011092951B2

(12) United States Patent
Rikkola et al.

(10) Patent No.: US 11,092,951 B2
(45) Date of Patent: Aug. 17, 2021

(54) METHOD AND SYSTEM FOR PREDICTING FAILURE OF MINING MACHINE CROWD SYSTEM

(71) Applicant: Harnischfeger Technologies, Inc., Wilmington, DE (US)

(72) Inventors: Michael Rikkola, New Berlin, WI (US); Kenneth Daniel, Libertyville, IL (US)

(73) Assignee: JOY GLOBAL SURFACE MINING INC, Milwaukee, WI (US)

( * ) Notice: Subject to any disclaimer, the term of this patent is extended or adjusted under 35 U.S.C. 154(b) by 702 days.

(21) Appl. No.: 15/946,291

(22) Filed: Apr. 5, 2018

(65) Prior Publication Data
US 2018/0335771 A1 Nov. 22, 2018

Related U.S. Application Data

(62) Division of application No. 13/106,574, filed on May 12, 2011, now Pat. No. 9,971,346.
(Continued)

(51) Int. Cl.
G05B 23/02 (2006.01)
G06F 21/55 (2013.01)
G06K 9/00 (2006.01)

(52) U.S. Cl.
CPC ......... *G05B 23/0232* (2013.01); *G05B 23/02* (2013.01); *G06F 21/554* (2013.01); *G06K 9/0014* (2013.01)

(58) Field of Classification Search
CPC ... G05B 23/02; G05B 23/0232; G06F 21/554; G06K 9/0014
See application file for complete search history.

(56) References Cited

U.S. PATENT DOCUMENTS

RE23,859 E * 8/1954 Sloane .................... E21C 27/30
299/67
4,097,091 A 6/1978 Knorr
(Continued)

FOREIGN PATENT DOCUMENTS

CN 2065775 U 11/1990
CN 1425234 6/2003
(Continued)

OTHER PUBLICATIONS

Office Action and Search Report issued from the Canadian Patent Office for related Application No. 2799404 dated Jul. 5, 2018 (6 Pages).
(Continued)

*Primary Examiner* — Manuel A Rivera Vargas
*Assistant Examiner* — Yaritza H Perez Bermudez
(74) *Attorney, Agent, or Firm* — Michael Best & Friedrich LLP

(57) ABSTRACT

Methods for monitoring a machine are described. In one aspect, a method includes receiving information on a plurality of events associated with the machine, determining a severity value for at least one event of the plurality of events, the severity value based on at least one of a safety value, a hierarchy value, a time-to-repair value, and a cost-of-repair value, and outputting an alert includes the severity value if the severity value exceeds a predetermined threshold associated with the at least one event. Systems and machine-readable media are also described.

18 Claims, 27 Drawing Sheets

Related U.S. Application Data

(60) Provisional application No. 61/334,657, filed on May 14, 2010.

(56) References Cited

U.S. PATENT DOCUMENTS

| | | | |
|---|---|---|---|
| 4,258,421 A | 3/1981 | Juhasz et al. | |
| 4,389,694 A | 6/1983 | Cornwell, Jr. | |
| 5,216,922 A | 6/1993 | Gustafson et al. | |
| 5,515,736 A * | 5/1996 | Kawagoe | G01D 3/036 73/862.333 |
| 5,710,723 A | 1/1998 | Hoth et al. | |
| 5,844,800 A | 12/1998 | Brandt et al. | |
| 5,963,884 A | 10/1999 | Billington et al. | |
| 6,204,772 B1 | 3/2001 | DeMay et al. | |
| 6,301,531 B1 * | 10/2001 | Pierro | B61L 27/0094 701/31.4 |
| 6,314,667 B1 * | 11/2001 | Rife | E02F 3/30 37/397 |
| 6,385,497 B1 | 5/2002 | Ogushi et al. | |
| 6,405,108 B1 * | 6/2002 | Patel | G05B 23/0221 701/19 |
| 6,449,884 B1 | 9/2002 | Watanabe et al. | |
| 6,542,077 B2 | 4/2003 | Joao | |
| 6,542,856 B2 | 4/2003 | Frantz et al. | |
| 6,549,014 B1 | 4/2003 | Kutkut et al. | |
| 6,587,812 B1 | 7/2003 | Takayama | |
| 6,647,328 B2 * | 11/2003 | Walker | B60R 25/02 701/36 |
| 6,651,001 B2 | 11/2003 | Apsell | |
| 6,745,153 B2 | 6/2004 | White et al. | |
| 6,778,893 B2 | 8/2004 | Murakami et al. | |
| 6,810,362 B2 | 10/2004 | Adachi et al. | |
| 6,832,175 B2 | 12/2004 | Adachi et al. | |
| 6,879,910 B2 | 4/2005 | Shike et al. | |
| 6,883,101 B1 | 4/2005 | Fox et al. | |
| 6,896,055 B2 | 5/2005 | Koithan | |
| 6,907,384 B2 | 6/2005 | Adachi et al. | |
| 6,963,786 B2 | 11/2005 | Ogushi et al. | |
| 6,982,657 B2 | 1/2006 | Kinugawa et al. | |
| 7,181,370 B2 * | 2/2007 | Furem | E02F 9/205 701/50 |
| 7,184,930 B2 * | 2/2007 | Miyasaka | B61F 15/20 702/183 |
| 7,264,050 B2 | 9/2007 | Koithan et al. | |
| 7,272,538 B2 | 9/2007 | Baker et al. | |
| 7,287,188 B2 | 10/2007 | Shibata et al. | |
| 7,313,447 B2 | 12/2007 | Hsiung et al. | |
| 7,324,923 B2 | 1/2008 | Della Villa, Jr. et al. | |
| 7,346,405 B2 | 3/2008 | Yen et al. | |
| 7,406,399 B2 | 7/2008 | Furem et al. | |
| 7,433,802 B2 | 10/2008 | Olsson | |
| 7,552,029 B2 | 6/2009 | Elwood et al. | |
| 7,689,394 B2 | 3/2010 | Furem et al. | |
| 7,711,522 B2 | 5/2010 | Gualandri et al. | |
| 7,819,312 B2 * | 10/2010 | Gualandri | B60R 25/33 235/382 |
| 8,306,797 B2 * | 11/2012 | Furem | E02F 9/2054 703/8 |
| 8,723,344 B1 * | 5/2014 | Dierickx | H02K 7/1846 290/1 R |
| 8,838,417 B2 | 9/2014 | Rikkola et al. | |
| 9,260,834 B2 * | 2/2016 | Lee | E02F 3/425 |
| 9,372,482 B2 * | 6/2016 | Rikkola | G05B 23/0232 |
| 9,971,346 B2 | 5/2018 | Rikkola et al. | |
| 10,663,518 B2 * | 5/2020 | Yoshiura | G01R 31/346 |
| 2001/0039501 A1 | 11/2001 | Crevel et al. | |
| 2002/0093423 A1 * | 7/2002 | Asumi | F16H 57/01 340/457 |
| 2002/0107624 A1 | 8/2002 | Rutz | |
| 2002/0124652 A1 | 9/2002 | Schultz et al. | |
| 2002/0124663 A1 * | 9/2002 | Tokumoto | G01L 3/109 73/862.333 |
| 2002/0125865 A1 | 9/2002 | Buchanan | |
| 2002/0155909 A1 * | 10/2002 | Roby | F16H 55/56 474/14 |
| 2003/0028269 A1 | 2/2003 | Spriggs et al. | |
| 2003/0036939 A1 | 2/2003 | Flores et al. | |
| 2003/0042861 A1 | 3/2003 | Schwartz et al. | |
| 2003/0093188 A1 | 5/2003 | Morita et al. | |
| 2003/0126258 A1 | 7/2003 | Conkright et al. | |
| 2003/0216901 A1 | 11/2003 | Schaumont et al. | |
| 2004/0019461 A1 * | 1/2004 | Bouse | G05B 23/0229 702/188 |
| 2004/0081561 A1 * | 4/2004 | Iwanami | F04C 29/0085 417/42 |
| 2004/0102928 A1 | 5/2004 | Cuddihy et al. | |
| 2004/0148385 A1 | 7/2004 | Srinivasan et al. | |
| 2005/0015624 A1 | 1/2005 | Ginter et al. | |
| 2005/0085973 A1 | 4/2005 | Furem et al. | |
| 2005/0116836 A1 | 6/2005 | Perry et al. | |
| 2005/0144936 A1 | 7/2005 | Hulse et al. | |
| 2005/0151513 A1 | 7/2005 | Cook et al. | |
| 2005/0154542 A1 | 7/2005 | Frerichs et al. | |
| 2005/0245341 A1 | 11/2005 | Mueller et al. | |
| 2006/0106549 A1 | 5/2006 | Olsson | |
| 2006/0221848 A1 | 10/2006 | Lake | |
| 2006/0265153 A1 | 11/2006 | Astley et al. | |
| 2006/0273918 A1 | 12/2006 | Ram et al. | |
| 2007/0088465 A1 * | 4/2007 | Heffington | G07C 5/085 701/1 |
| 2007/0212126 A1 * | 9/2007 | Seto | G03G 15/167 399/302 |
| 2007/0284147 A1 | 12/2007 | Moran | |
| 2008/0040477 A1 | 2/2008 | Johnson et al. | |
| 2008/0097628 A1 * | 4/2008 | Weatherhead | G05B 23/0256 700/54 |
| 2008/0195365 A1 * | 8/2008 | Ohkura | E02F 9/20 703/8 |
| 2008/0201108 A1 | 8/2008 | Furem et al. | |
| 2008/0246335 A1 | 10/2008 | Spieker et al. | |
| 2008/0291918 A1 | 11/2008 | Turcot | |
| 2008/0312988 A1 | 12/2008 | Trapp et al. | |
| 2009/0015422 A1 | 1/2009 | Sixt, Jr. et al. | |
| 2009/0024262 A1 | 1/2009 | Amamiya | |
| 2009/0027006 A1 | 1/2009 | Vezzini et al. | |
| 2009/0031018 A1 | 1/2009 | Conkright et al. | |
| 2009/0100293 A1 | 4/2009 | LaComb et al. | |
| 2009/0297273 A1 | 12/2009 | Lindbergh et al. | |
| 2010/0076612 A1 | 3/2010 | Robertson | |
| 2010/0271990 A1 | 10/2010 | Leelahakriengkrai et al. | |
| 2012/0027882 A1 * | 2/2012 | Komamura | B29C 45/76 425/169 |
| 2013/0327306 A1 * | 12/2013 | Hooper | F01L 7/12 123/65 R |

FOREIGN PATENT DOCUMENTS

| | | |
|---|---|---|
| CN | 1633566 U | 6/2005 |
| CN | 1820262 | 6/2006 |
| CN | 1867932 | 11/2006 |
| CN | 201065923 Y | 5/2008 |
| CN | 101259443 | 9/2008 |
| CN | 101683626 | 3/2010 |
| WO | WO2000051360 | 8/2000 |
| WO | WO2000052627 | 8/2000 |
| WO | WO2001084258 | 11/2001 |
| WO | 03036133 A2 | 5/2003 |
| WO | WO2004111785 | 12/2004 |
| WO | WO2005038613 | 4/2005 |
| WO | WO2006052895 | 5/2006 |
| WO | WO2006133340 | 12/2006 |
| WO | WO2008153666 | 12/2008 |

OTHER PUBLICATIONS

Chinese Patent Office Action for Application No. 201610565404.4 dated Apr. 17, 2019 (8 pages).

Canadian Patent Office Search Report for Application No. 2799404 dated Apr. 11, 2019 (3 pages).

(56) References Cited

OTHER PUBLICATIONS

Australian Government Patent Examination Report No. 1 for Patent Application No. 2018256654 dated Dec. 24, 2019 (4 pages).
International Search Report for related International Patent Application No. PCT/US2011I/036296, dated Aug. 30, 2011.
Hanson, Curt, Remote Health Monitoring for Mining Shovels, Engineering and Mining Journal, Sep. 2009, pp. 40-41.
International Search Report for related International Patent Application No. PCT/US2011/036287, dated Aug. 25, 2011.
International Search Report for related International Patent Application No. PCT/US2011/036303, dated Aug. 19, 2011.
Patent Examination Report No. 1 from the Australian Intellectual Property Office for Application No. 2011252963 dated Nov. 22, 2013 (3 pages).
Patent Examination Report No. 1 from the Australian Intellectual Property Office for Application No. 2011252970 dated Nov. 22, 2013 (3 pages).
Office Action from the United States Patent and Trademark Office for U.S. Appl. No. 13/106,561 dated Nov. 21, 2013 (21 pages).
Notice of Allowance from the United States Patent and Trademark Office for U.S. Appl. No. 13/106,561 dated Jun. 2, 2014 (13 pages).
Australian Government Patent Examination Report No. 1 for Patent Application No. 2011252966 dated Mar. 31, 2014 (3 pages).
Office Action from the United States Patent and Trademark Office for U.S. Appl. No. 13/106,536 dated Apr. 10, 2014 (35 pages).
First Office Action from The Intellectual Property Office of the People's Republic of China for Application No. 201180034630.5 dated Sep. 17, 2014 (12 pages).
"Research on Key Techniques in Data Cleaning and its Software Applications," Doctorate Dissertation by Wei Chen, Jun. 2, 2004 (10 pages).
Office Action from the United States Patent and Trademark Office for U.S. Appl. No. 13/106,536 dated Nov. 3, 2014 (36 pages).
First Office Action from the Chilean Patent Office for Application No. 2012-003189 dated Dec. 23, 2014 (8 pages) and English translation/statement of relevance.
First Office Action from the Chilean Patent Office for Application No. 2012-003190 dated Dec. 29, 2014 (8 pages) and English translation/statement of relevance.
First Office Action from the Chilean Patent Office for Application No. 2012-003188 dated Dec. 30, 2014 (9 pages) and English translation/statement of relevance.
First Office Action with partial English translation from The State Intellectual Property Office of the People's Republic of China for Application No. 201180034628.8 dated Nov. 28, 2014 (26 pages).
Office Action from United States Patent and Trademark Office for U.S. Appl. No. 13/106,536 dated Mar. 11, 2015 (46 pages).
Office Action from the United States Patent and Trademark Office for U.S. Appl. No. 13/106,536 dated Mar. 11, 2015 (46 pages).
Office Action from The Chilean Patent Office for Application No. 2012-003189 dated Mar. 25, 2015 (7 pages).
Office Action from The Patent Office of the People's Republic of China for Application No. 201180034698.3 dated Mar. 10, 2015 (13 pages).
Office Action from the Chilean Patent Office for Application No. 2012-003190 dated Mar. 25, 2015 (7 pages).
Office Action from the Chilean Patent Office for Application No. 2012-003188 dated Mar. 25, 2015 (9 pages).
Statement of Relevance for Chinese Office Action from the State Intellectual Property Office of the People's Republic of China for Application No. 201180034698.3 dated Mar. 10, 2015 (1 page).
Second Office Action from the Intellectual Property Office of the People's Republic of China for Application No. 201180034630.5 dated May 26, 2015 (7 pages).
Second Office Action from the State Intellectual Property Office of the People's Republic of China for Application No. 201180034628.8 dated Jul. 9, 2015 (7 pages).
Final Office Action from the United States Patent and Trademark Office for U.S. Appl. No. 13/106,536 dated Oct. 16, 2015 (31 pages).
First Examination Report from the Australian Patent Office for Application No. 2015200309 dated Feb. 16, 2016 (5 pages).
Examination Report No. 1 from the Australian Intellectual Property Office for Application No. 2016222450 dated Nov. 3, 2017 (5 pages).
Sgolli et al., "A MOM-based solution for remote monitoring of equipment in mines", Enterprise Distributed Object computing Conference, 2003. Proceedings. Seventh IEEE International,Sep. 19, 2003 {Sep. 19, 2003).
Examination Report from the Canadian Patent Office for Application No. 2,799,402 dated Feb. 20, 2017 (4 pages).
Second Examination Report from the Australian Intellectual Property Office for Application No. 2016222450 dated Mar. 21, 2018 (3 pages).
Office Action and Search Report from the Chinese Patent Office for Application No. 201610565404.4 dated Apr. 18, 2018 (14 pages including English translation).
Canadian Patent Office Action for Application No. 2799402 dated Mar. 20, 2019 (4 pages).
Office Action and Search Report issued from the Canadian Patent Office for related Application No. 2799331 dated Oct. 12, 2018 (6 Pages).
Third Examination Report from the Australian Intellectual Property Office for Application No. 2016222450 dated Nov. 3, 2018 (3 pages).
Office Action issued from the Chinese Patent Office for related Application No. 201610565404.4 dated Nov. 8, 2018 (42 pages including English translation).

\* cited by examiner

| Case Number ▷ ▢ | Contact Name ▷ ▢ | Subject ▷ ▢ | Alert Date ▷ ▢ | Message ▷ ▢ | Status ▷ ▢ | External comments ▷ ▢ |
|---|---|---|---|---|---|---|
| 00014064 | Kenneth Daniel | sp_Ins_CSR_item from SS | 10/9/2009 10:13:43 AM | Testing - AlertProcessSource. Did this get past exe? 20091009_2 Urgency: 000-No Severity | New | |
| 00014062 | Kenneth Daniel | sp_Ins_CSR_item- | 10/9/2009 9:34:10 AM | Testing - AlertProcessSource. Did this get past exe? 3x Urgency: Leave Message | New | |
| 00014061 | Kenneth Daniel | sp_Ins_CSR_item- | 10/9/2009 9:26:59 AM | Testing - AlertProcessSource. Did this get past exe? Urgency: 664 | New | |
| 00014059 | Kenneth Daniel | sp_Ins_CSR_item- | 10/9/2009 9:22:52 AM | Testing - AlertProcessSource. Did this get past exe? Urgency: 664 | New | |
| 00014049 | Kenneth Daniel | sp_Ins_CSR_item- | 10/8/2009 12:48:33 PM | Testing - AlertProcessSource. Urgency:664 | Closed | |
| 00014047 | Kenneth Daniel | sp_Ins_CSR_item- | 10/8/2009 12:30:33 PM | Testing - AlertProcessSource. Urgency:664 | Closed | |

Change page: ◁ 1 ▷  Change page: [1] Go  Page size: [6] Change  Displaying page 1 of 1, items 1 to 6 of 6.

| Description | Safety | Hierarchy | Downtime | Cost | Safety Weight | Hierarchy Weight | Downtime Weight | Cost Weight | Severity | Subsystem |
|---|---|---|---|---|---|---|---|---|---|---|
| Milltronics Level Sensor Profibus fault | 1 | 1 | 1 | 1 | 180 | 77 | 38 | 37 | 332 | Electrical |
| Auto Brake - 18 second Warning | 1 | 1 | 1 | 2 | 180 | 77 | 38 | 37 | 369 | Electrical |
| ABSS High Limit Fault | 1 | 1 | 2 | 1 | 180 | 77 | 38 | 37 | 370 | Misc |
| Control Cabinet Fan Contact Fault | 1 | 1 | 2 | 2 | 180 | 77 | 38 | 37 | 407 | Misc |
| SWG Speed Scaling Out Of Range Alarm | 1 | 2 | 1 | 1 | 180 | 77 | 38 | 37 | 409 | Swing |
| CROWD GEARCASE OIL LEVEL LOW | 1 | 1 | 3 | 3 | 180 | 77 | 38 | 37 | 482 | Crowd |
| Swing Lube Pump 2 Flow Fault | 1 | 2 | 2 | 2 | 180 | 77 | 38 | 37 | 484 | Swing |
| CP FLD Mains Under Voltage Alarm | 1 | 3 | 1 | 1 | 180 | 77 | 38 | 37 | 486 | Crowd |
| TripRite Rack Fault | 2 | 1 | 1 | 1 | 180 | 77 | 38 | 37 | 512 | Misc |
| CP FLD Type Code Backup Fault | 2 | 1 | 1 | 2 | 180 | 77 | 38 | 37 | 549 | Crowd |
| Center Gudgeon Over Temp Alarm | 2 | 2 | 3 | 3 | 180 | 77 | 38 | 37 | 559 | Misc |
| DDCS SWG Fld Comm Fault | 2 | 1 | 2 | 2 | 180 | 77 | 38 | 37 | 587 | Swing |
| AirScrubPro Supply Circuit Breaker Open | 2 | 2 | 1 | 1 | 180 | 77 | 38 | 37 | 589 | Misc |
| Left Front Swing Lube Pump Fault | 2 | 2 | 2 | 2 | 180 | 77 | 38 | 37 | 590 | Swing |
| AirScrubPro Conveyor OL Tripped - F5 | 2 | 2 | 1 | 2 | 180 | 77 | 38 | 37 | 626 | Misc |
| Swing Rear Transmission Oil Level Low | 2 | 1 | 3 | 3 | 180 | 77 | 38 | 37 | 662 | Swing |
| Crowd Arm contactor aux contact did not close | 2 | 2 | 2 | 2 | 180 | 77 | 38 | 37 | 664 | Crowd |
| Control Cabinet Blower 480V Fault | 2 | 3 | 1 | 1 | 180 | 77 | 38 | 37 | 666 | Electrical |
| Aux Door / Breaker Open Fault | 3 | 1 | 1 | 1 | 180 | 77 | 38 | 37 | 692 | Misc |
| CP2 Armature Over Voltage Fault | 2 | 2 | 2 | 3 | 180 | 77 | 38 | 37 | 701 | Crowd |
| Swing Field Breaker Open Fault | 2 | 3 | 1 | 2 | 180 | 77 | 38 | 37 | 703 | Swing |
| Left Joystick Fault - Crowd < Min | 3 | 1 | 1 | 2 | 180 | 77 | 38 | 37 | 729 | Crowd |
| Static Brake Swing Test Failed | 3 | 1 | 2 | 1 | 180 | 77 | 38 | 37 | 730 | Swing |
| Low Lube In Hoist Gearcase Fault | 2 | 2 | 3 | 3 | 180 | 77 | 38 | 37 | 739 | Hoist |
| Swing Converter Phase Fault | 2 | 3 | 2 | 2 | 180 | 77 | 38 | 37 | 741 | Swing |
| Emergency Stop PushbuttonFault | 3 | 2 | 1 | 1 | 180 | 77 | 38 | 37 | 769 | Misc |
| SWG FLD Earth Fault | 2 | 3 | 2 | 3 | 180 | 77 | 38 | 37 | 778 | Swing |
| Crowd Brake Set Time Warning | 3 | 2 | 2 | 1 | 180 | 77 | 38 | 37 | 807 | Crowd |
| Main Transformer Over Current Fault | 2 | 3 | 3 | 3 | 180 | 77 | 38 | 37 | 816 | Electrical |
| Swing Brakes Did Not Release Fault | 3 | 2 | 2 | 2 | 180 | 77 | 38 | 37 | 844 | Swing |
| CP FLD Armature Over Voltage Fault | 3 | 2 | 2 | 3 | 180 | 77 | 38 | 37 | 881 | Crowd |
| CP2 Motor Overspeed Fault | 3 | 2 | 3 | 2 | 180 | 77 | 38 | 37 | 882 | Crowd |
| Crowd Brakes Did Not Set Fault | 3 | 2 | 3 | 3 | 180 | 77 | 38 | 37 | 919 | Crowd |
| FireSystem - RPC cab suppression Active | 3 | 3 | 2 | 2 | 180 | 77 | 38 | 37 | 921 | Misc |

*FIG. 19B*

METHOD AND SYSTEM FOR PREDICTING FAILURE OF MINING MACHINE CROWD SYSTEM

CROSS-REFERENCE TO RELATED APPLICATIONS

This application is a divisional of U.S. patent application Ser. No. 13/106,574 filed May 12, 2011, which claims the benefit of U.S. Provisional Patent Application Ser. No. 61/334,657 entitled "Remote Monitoring of Equipment," filed on May 14, 2010, both disclosures of which are hereby incorporated by reference in their entirety.

FEDERALLY SPONSORED RESEARCH OR DEVELOPMENT

Not applicable.

TECHNICAL FIELD

The present disclosure generally relates to equipment monitoring, and specifically, to remotely monitoring heavy duty machinery.

DESCRIPTION OF THE RELATED ART

It is well known that heavy duty industrial machinery requires maintenance to maintain machine uptime. As machines increase in size, complexity, and cost, failure to maintain the machines results in greater impact to production and cost. Information on why a machine failed is often not captured, thereby making it difficult to identify and troubleshoot any problems that led to the failure. Furthermore, even if the information is captured, it is usually stored onboard the machine, making it inaccessible to remote maintenance staff, thereby hindering root cause analysis and condition-based maintenance initiatives. Thus, while machine maintenance systems according to the prior art provide a number of advantageous features, they nevertheless have certain limitations.

The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY

What is needed is a system for capturing information related to machine problems that allows the information to be accessible to remote maintenance staff. What is also needed is the ability to provide users of the machine with real-time information, data, trending and analysis tools to rapidly identify a cause of a machine problem in order to reduce unplanned downtime. What is further needed is the ability to provide remote maintenance staff access to the machine in order to solve the machine problem remotely, thereby reducing downtime associated with diagnosing faults.

In certain embodiments, the disclosed systems and methods increase the efficiency and operability of a machine by remotely collecting and analyzing machine data, and then predicting events and faults before they occur in order to prevent failures. The data is further reviewed to identify issues that require attention, allowing for streamlined analysis and workflow processes. The information is used to more accurately predict the actual time of planned maintenances, reduce unnecessary maintenances, and increase machine availability. The information is also used to identify design improvement opportunities to increase the machine's performance and quality. The information, which includes machine health and performance data, can further be used to avert machine breakdowns, target and predict maintenance actions, and improve machine uptime and cost per unit. The information facilitates improved surveillance of the machine, accelerates response to breakdowns, reduces the need for unscheduled maintenance, helps improve operating practices, proactively detects failures in time to prevent cascade damage, captures expertise of qualified personnel, provides real time feedback to enhance operator skill and performance, and enables best practices and significantly extends machine life that may reduce mean time to repair (MTTR), increase uptime, reduce operations costs, reduce maintenance costs, reduce warranty claims, improve mean time between failure (MTBF), improve mean time to shutdown (MTTS), improve productivity, improve utilization, improve responsiveness to faults, and improve parts lead time.

In certain embodiments, a method for monitoring a machine is disclosed. The method includes receiving information on a plurality of events associated with the machine, determining a severity value for at least one event of the plurality of events, the severity value based on at least one of a safety value, a hierarchy value, a time-to-repair value, and a cost-of-repair value, and outputting an alert includes the severity value if the severity value exceeds a predetermined threshold associated with the at least one event.

In certain embodiments, a system for monitoring a machine is disclosed. The system includes a memory including information on a plurality of events associated with the machine, and a processor. The processor is configured to determine a severity value for at least one event of the plurality of events, the severity value based on at least one of a safety value, a hierarchy value, a time-to-repair value, and a cost-of-repair value, and an output module configured to output an alert includes the severity value if the severity value exceeds a predetermined threshold associated with the at least one event.

In certain embodiments, a machine-readable storage medium includes machine-readable instructions for causing a processor to execute a method for monitoring a machine is disclosed. The method includes receiving information on a plurality of events associated with the machine, determining a severity value for at least one event of the plurality of events, the severity value based on at least one of a safety value, a hierarchy value, a time-to-repair value, and a cost-of-repair value, and outputting an alert includes the severity value if the severity value exceeds a predetermined threshold associated with the at least one event.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 18B illustrates an exemplary screenshot for viewing a history of alerts communicated by the system of FIG. 1A.

FIG. 19A illustrates an exemplary screenshot of a list of faults for a machine being monitored by the system of FIG. 1A.

FIG. 19B illustrates exemplary weighting determinations for various faults identified by the system of FIG. 1A.

DETAILED DESCRIPTION

Figure 1A:
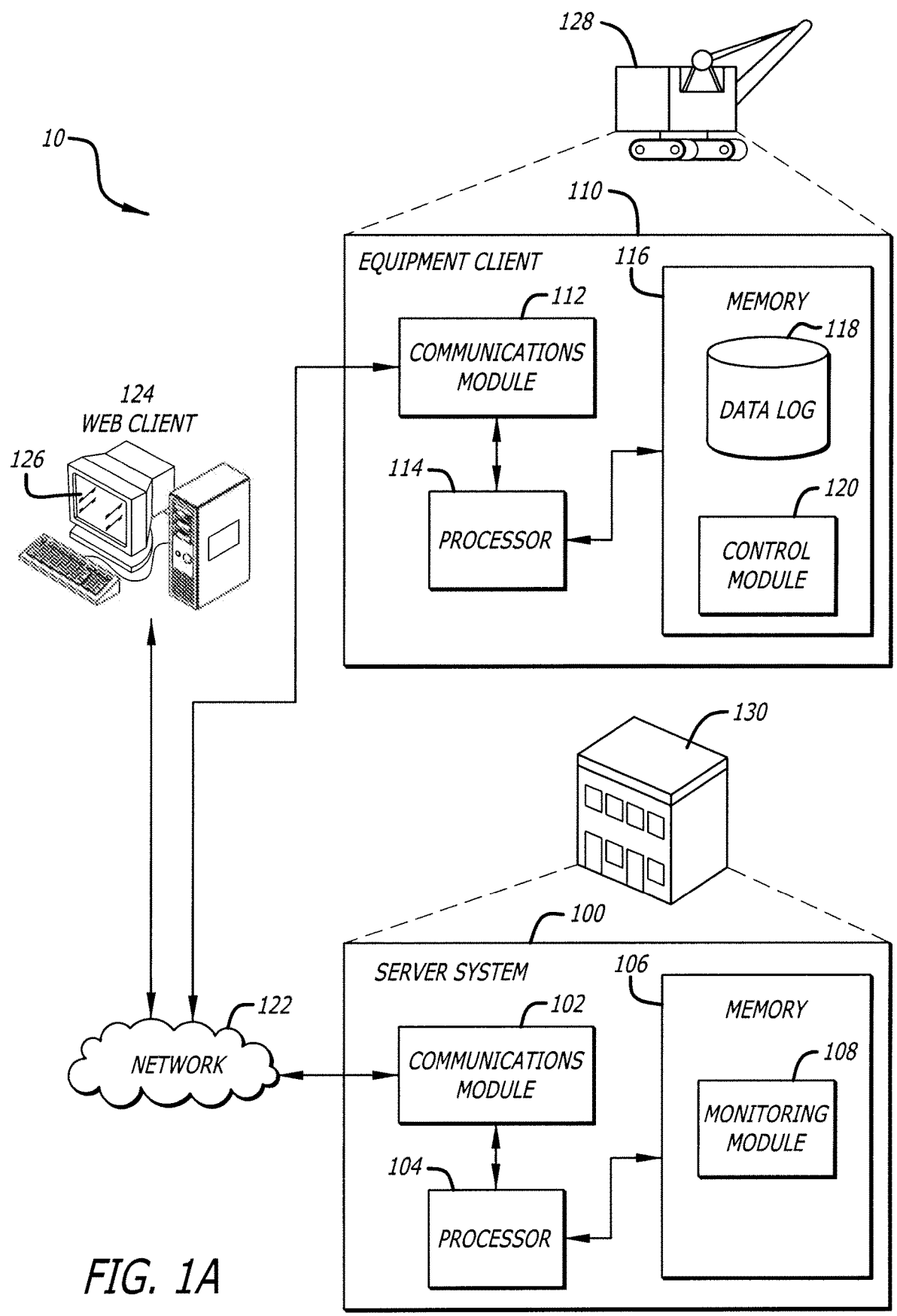
FIG. 1A illustrates an architecture that includes a system for remotely monitoring equipment in accordance with certain embodiments.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. Additionally, in the following detailed description, numerous specific details are set forth to provide a full understanding of the present disclosure. It will be obvious, however, to one ordinarily skilled in the art that the embodiments of the present disclosure may be practiced without some of these specific details. In other instances, well-known structures and techniques have not been shown in detail not to obscure the disclosure.

Referring now to the Figures, and specifically to FIG. 1, there is shown an architecture 10 that includes a system 10 for remotely monitoring a machine 128 in accordance with certain embodiments. The architecture includes a server system 100, equipment client 110, and web client 124, connected over a network 122.

The server system 100 is configured to remotely monitor machines 128, such as, for example, drills, conveyors, draglines, shovels, surface and underground mining machines, haulage vehicles, mining crushers, and other heavy machinery which include an equipment client 110. The system 100 includes a communications module 102, a processor 104, and a memory 106 that includes a monitoring module 108. The server system 100 can be located at a facility remote to the machine 128 (or "equipment"), such as in a remote office building. In certain embodiments, the server system 100 includes multiple servers, such as a server to store historical data, a server responsible for processing alerts, and a server to store any appropriate databases.

The system processor 104 is configured to execute instructions. The instructions can be physically coded into the processor 104 ("hard coded"), received from software, such as the monitoring module 108, or a combination of both. In certain embodiments, the monitoring module provides a dashboard accessible by the web client 124, and instructs the system processor 104 in conducting an analysis of the data 118 received from the equipment client 110. The monitoring module 108 may also provide a workflow based on data 118 (or "data log 118") received from the equipment client 110. As discussed herein, data 118 is collected at the machine 128 by the equipment client 110 using sensors (a term understood to include, without limitation, hydraulic, electronic, electro-mechanical or mechanical sensors, transducers, detectors or other measuring or data acquisition apparatus) appropriately placed in and around the machine 128. The sensors (not shown in the figures), which can obtain, for example, temperature, voltage, time, and a variety of other forms of information, are coupled to the equipment client 110 via appropriate means. The data 118, once collected by the sensors, can be logged in memory 116 that is typically located on or near the equipment client 110. As discussed in more detail below, the data 118 can be subsequently transmitted or otherwise provided to the memory 106 of the server system 100 over the network 122 or by other means. The workflow and related tools allow for the rapid transfer of information between the equipment and a workforce that reduces a mean time to repair (MTTR) and unplanned downtime. The workflow tools further allow a user to create, modify, and delete alerts, provide resolution input (e.g., action taken, comments), and track and/or monitor workflow. The conducted analysis includes root cause analysis and critical issue identification focusing on rapid detection resulting in less downtime for problem resolution.

In one embodiment, the system processor 104 is configured to process and optionally store information from the equipment client 110, such as, but not limited to, episodes, runtime, abuse factors, electrical downtime, cycle information, payload information, loading efficiency, machine hours, tonnage summary, cycle decomposition, availability, voltage, runtime (e.g., total, hoist, crowd, propel, etc.), raw critical equipment parameters, measurements, and status(es). For example, for shovels, the abuse factor can be calculated based on swing impacts, boom jacks, operating hours, payload overloads, motor stalls, and undervoltage events. The server system 100 is configured to provide remote, reliable, and accurate information and analysis tools for the machine 128 to optimize the health and performance of the machine 128.

Exemplary computing systems 100 include laptop computers, desktop computers, tablet computers, servers, clients, thin clients, personal digital assistants (PDA), portable computing devices, mobile intelligent devices (MID) (e.g., a smartphone), software as a service (SAAS), or suitable devices with an appropriate processor 104 and memory 106 capable of executing the instructions and functions discussed herein. The server system 100 can be stationary or mobile. In certain embodiments, the server system 100 is wired or wirelessly connected to a network 122 via a communications module 102 via a modem connection, a local-area network (LAN) connection including the Ethernet, or a broadband wide-area network (WAN) connection, such as a digital subscriber line (DSL), cable, T1, T3, fiber optic, cellular connection, or satellite connection. In the illustrated embodiment, the network 122 is the Internet, although in certain embodiments, the network 122 can be a LAN network or a corporate WAN network. The network 122 may include features such as a firewall.

The equipment client 110 is configured to transmit to and receive information from server system 100 over network 122, such as transmitting data 118 (e.g., a data log) of the equipment and receiving control commands for the equipment. In certain embodiments, the equipment client 110 is located within the machine 128, such as within a secure compartment of an electric shovel. The equipment client 110 includes a communications module 112, a processor 114, and a memory 116 that includes a control module 120 and the data 118.

In certain embodiments, the data 118 can be stored and transmitted later. The later transmission can be, for example, every few seconds, every minute, for longer periods, or after a certain time limit or data size limit is reached. The ability to transmit the data 118 in periods addresses the risk of a network 122 failure while also allowing the data 118 to be current data for the machine 128. The ability to transmit the data 118 in periods also allows the data 118 to be batched before being transmitted.

The equipment client processor 114 is also configured to store, in memory 116 data 118 related to the machine 128. At least two types of data 118 are stored, trend data and event data. Trend data generally is time series data of a particular measurement, such as temperature or voltage. Event data generally are warnings, faults and state messages coming from or generated by the equipment, which assists in providing information on the cycle decomposition for the machine 128, as discussed in more detail below. Any trend data or event data stored in the data 118 can be transmitted to the server system 100 for display at the web client 124. In certain embodiments, the transmitted data 118 comprises the trend data and the event data. As illustrated in FIG. 1B, the trend data can be transmitted on a first channel 113a (e.g., a virtual channel having a virtual channel identifier), over the network 122, separate from a second channel 113b transmitting the event data. The cycle decomposition state machine, which is executed on board the machine 128 as it is operated, identifies each event. Specifically, a machine state event is created for each state transition as raw data is analyzed by the equipment client 110 in real time. The states are then transmitted from the equipment client 110 to the server system 100 as event data. As a result, the processing of the state machine is pushed back on to the equipment client 110 of the machine 128 (e.g., a distributed architecture) rather than centrally at the server system 100, allowing for a much more scalable system. In certain embodiments, the transmitted trend data on the first channel 113a is synchronous to the transmitted event data on the second channel 113b, such that an event identified in the event data is associated with a trend or other data from the trend data received by the server system 100 at about the same time the event data is received. Alternately, the trend data may be received separately from the event data. Since the event data is associated with the trend data, events identified in the event data can be matched with the associated trend data. The separate transmission of trend data from event data permits the equipment client processor 114 to identify the events, making the overall architecture 10 more scalable by balancing the processing responsibilities for identifying events to the equipment connected to the network 122. Such configuration provides for dramatically increasing the processing capabilities of the trend data in the system processor 104.

Exemplary equipment clients 110 include heavy duty low profile computers, clients, portable computing devices, or suitable devices that have a low profile (e.g., small in size), are prepared for interference caused by being present at a work site, and include an appropriate processor 104 and memory 106 capable of executing the instructions and functions discussed herein. In certain embodiments, the equipment client 110 is wired or wirelessly connected to the network 122 via a communications module 102 via a modem connection, a local-area network (LAN) connection including the Ethernet, or a broadband wide-area network (WAN) connection, such as a digital subscriber line (DSL), cable, T1, T3, fiber optic, or satellite connection.

The web client 124 is configured to connect to either the server system 100 and/or the equipment client 110 over the network 122. This allows the web client 124 access to information on the equipment that is stored at either the server system 100. A user of the web client 124 may provide information to the server system 100 over network 122, such as, but not limited to, machine capacities, alert criteria, email addresses, annotations, report day offset, etc. In certain embodiments, the web client 124 accesses the server system 100 using a graphical user interface provided by the server system 100 and displayed on a display 126 of the web client, exemplary screenshots of which are included and discussed herein.

As discussed herein, and unless defined otherwise, an alert is an indication of a fault, event, or episode of a machine that may require human attention. Unless otherwise stated, the terms alert and episode, and the terms fault and event, can be used interchangeably. In certain embodiments, an episode is an accumulation of machine events that are marked in the beginning by the machine shutdown and terminated by the machine 128 having successfully restarted for greater than, for example, 30 seconds. The episode is generally identified by the most severe fault that occurred during this time. In certain embodiments, an event is a machine failure resulting in a shutdown of the machine 128. In certain embodiments, a fault is a predetermined type of event that may indicate abnormal machine operation. In certain embodiments, a machine 128 is a piece of equipment that is being monitored by the server system 100, e.g., shovels, drills, draglines, surface and underground mining machines, haulage vehicles, mobile mining crushers, or other machinery. In certain embodiments, a trend is a graphical display of machine data over a set time period.

As discussed above, the system processor 104 of the server system 100 is configured to execute instructions for providing a dashboard for the equipment. The dashboard is configured to provide a high level situational view of equipment for optimizing maintenance and productivity goals.

Figure 1B:
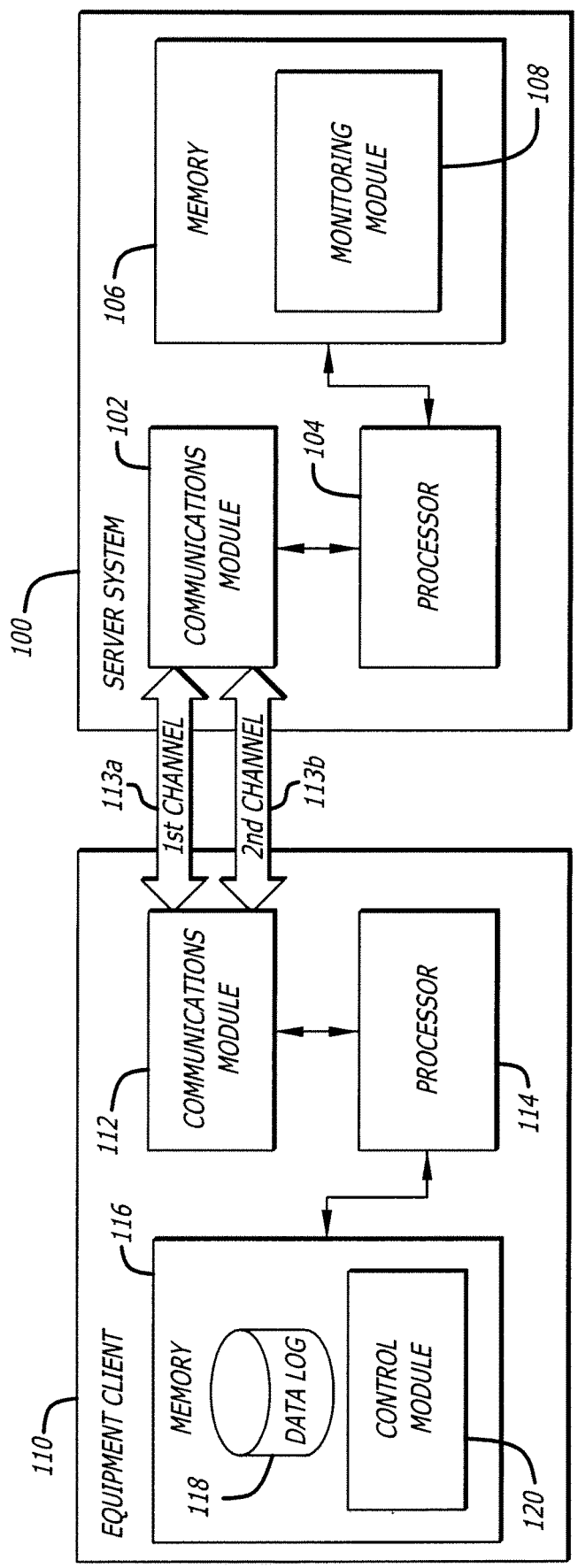
FIG. 1B illustrates separate communications channels for transmitting information between the equipment client and the server system of FIG. 1A in accordance with certain embodiments.
Figure 2:
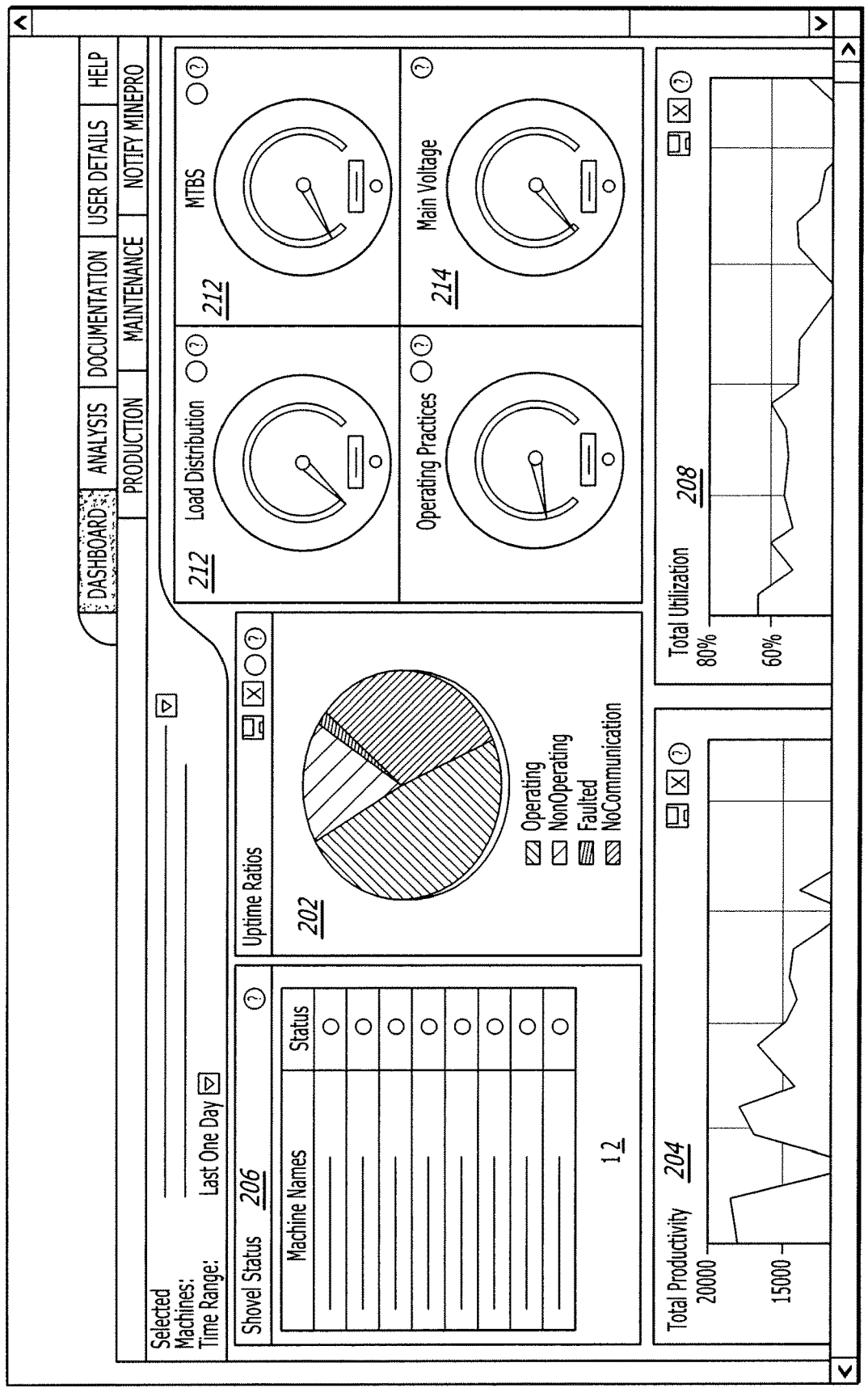
FIG. 2 is an exemplary screenshot from a web client displaying a dashboard of information regarding a fleet of machines being monitored by the system of FIG. 1A.

FIG. 2 illustrates an exemplary screenshot of a dashboard 200 as displayed on the display 126 of the web client 124. The dashboard 200 is configured to provide information regarding a fleet of machines 128 monitored by the server system 100 of FIG. 1, such as current fleet status, productivity, availability, and utilization. As also illustrated in FIG. 2, the dashboard 200 is configured to provide historical comparisons of information and key performance indicators (KPI).

In one embodiment the dashboard 200 includes information on uptime ratios 202, total productivity 204, shovel status 206, total utilization 208, load distribution 210, MTBS 212, and main voltage 214. Total productivity 204 displays the cycle decomposition for the selected machine 128 or an average value if multiple machines 128 have been selected. Machine status 206 displays the status of all machines 128 in a fleet. Total utilization 208 displays a percentage of utilization based on average load and target load (e.g., target dipper load) for a selected machine 128 or an average value if multiple machines 128 have been selected. Loading distribution 210 displays the distribution of loads for a selected machine 128 or an average value if multiple machines 128 have been selected. MTBS 212 displays the elapsed running time between fault-caused shutdowns (not mechanical shutdowns) for a selected machine 128 or an average value if multiple machines 128 have been selected. Main voltage 214 displays the average daily counts of low voltage (e.g., 5% low) events for a selected machine 128 or an average value if multiple machines 128 have been selected.

Uptime ratios 202 display the machine run time breakdown for a selected machine 128 or an average value if multiple machines 128 have been selected. Uptime ratios 202 provide information (e.g., a pie-chart) on the uptime 202 of machines in a fleet. In certain embodiments, the system 100 calculates the availability of a machine 128 based upon the following equation:

$$\text{Availability} = \frac{\sum_{\text{User Defined Time Period}} (\text{Shutdown\_time} - \text{Start\_time})}{\text{Total\_Time\_User\_Defined\_Time\_Period}}$$

This calculation can be displayed as a percentage. The illustrated uptime ratios 202 include the percentage of time that the fleet of machines 128 is operational, non-operational, faulted, and when the machines 128 are providing no communication. For example, the uptime ratio can include the time a machine is digging, waiting, propelling, or conducting another activity. In certain embodiments, a machine will, for example, go into a no communications state when there has been no message from the machine for 5 minutes. If communication resumes and data are received for the no communications period, the no communications period is removed and all statistics for the shovel are corrected.

Figure 3A:
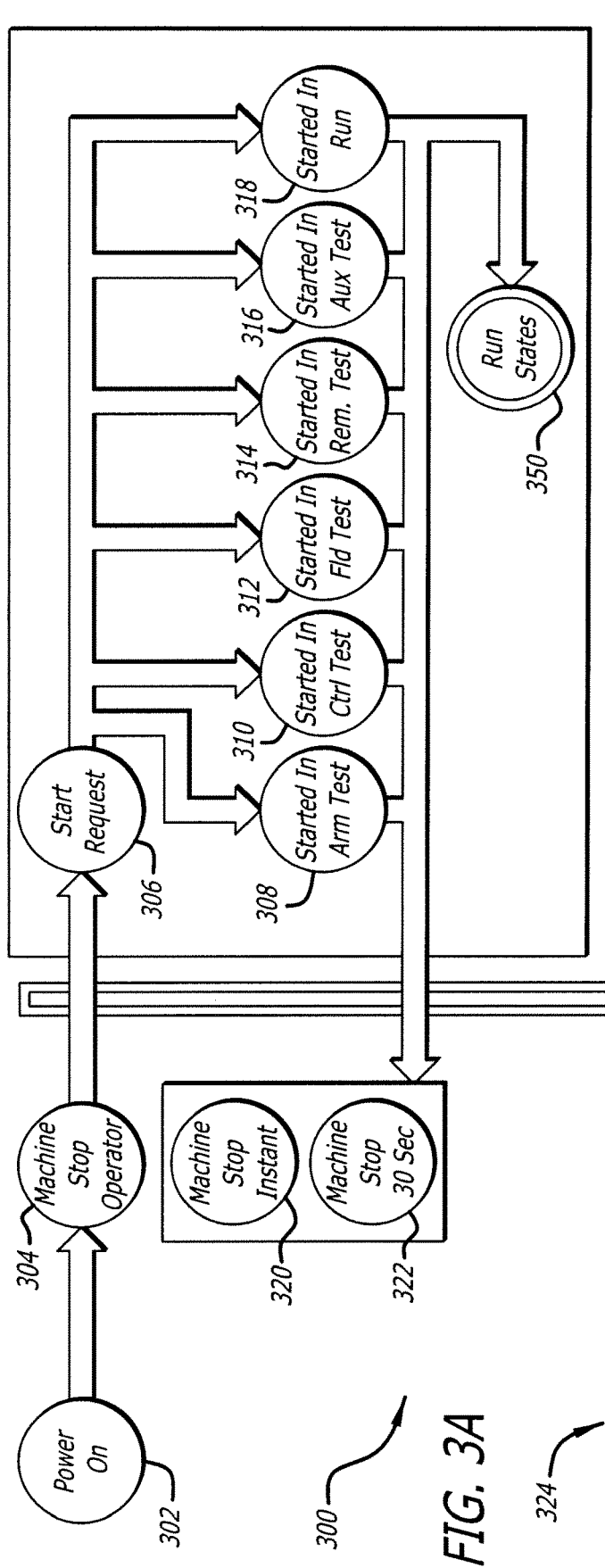
FIG. 3A is an exemplary state diagram of basic machine states for a machine being monitored by the system of FIG. 1A.

FIG. 3A is an exemplary state diagram of basic machine states 300 that are used to determine uptime ratios. Each of the states 300 may be associated with the categories (e.g., operating, non-operating, faulted, no communication, respectively) of the uptime ratios 202 of FIG. 2 according to certain logic, as described in the illustrated table 324. In certain embodiments, each of the categories is assigned a color (e.g., grey, yellow, green, and red).

Following an initial power on state 302, a machine 128 goes into a machine stop operator state 304 (e.g., where equipment is manually stopped by an operator). From this state 304, the machine 128 enters a start request state 306, from which it then proceeds to either the test start states 308, 310, 312, 314, or 316, or the started in run state 318. Specifically, a machine will, in certain embodiments, transition to one or more of the following states: "Started in Armature Test Mode" 308 if started and the Test switch is in the "Armature Test" position; "Started in Control Test Mode" 310 if started and the Test switch is in the "Control Test" position; "Started in Field Test Mode" 312 if started and the Test switch is in the "Field Test" position; "Started in Auxiliary Test Mode" 316 if started and the Test switch is in the "Auxiliary Test" position; and, "Started in Run Mode" 318 if started and the Test switch is in the "Run" position.

From the test states 308, 310, 312, 314, and 316, the machine 128 returns to either a machine stop operator state 304, a machine stop instant state 320, or a machine stop 30-second state 322 (e.g., in both states, the machine 128 is automatically stopped). Specifically, in certain embodiments, a machine 128 will transition to "Machine Stop Operator Mode" 304 from any state when the operator's cab STOP pushbutton is pressed, a machine 128 will transition to "Machine Stop Instant Mode" 320 from any state when an Instant Stop fault is initiated, and a machine 128 will transition to "Machine Stop 30 sec Mode" 322 from any state when a 30 second fault is initiated.

Figure 3B:
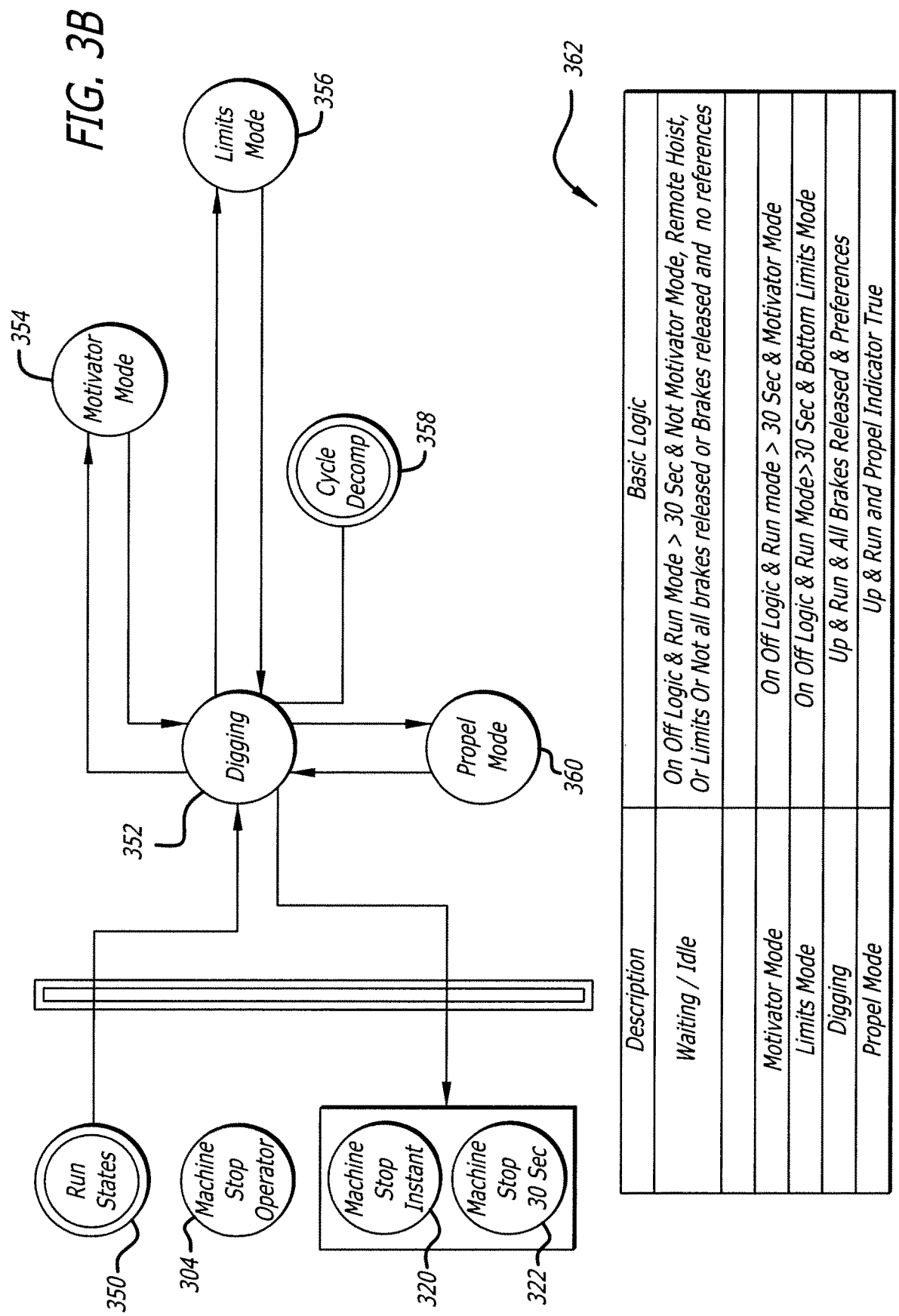
FIG. 3B is an exemplary state diagram of basic run states for a machine being monitored by the system of FIG. 1A.

From the started in run state 318, the machine continues to the run states 350 more fully illustrated in FIG. 3B. In one embodiment the run states 350 include digging 352, motivator mode 354, limits mode 356, cycle decomposition 358, and propel mode 360. The run states 350 proceed to either of the machine stop instant state 320, machine stop 30 second state 322, or machine stop operator state 304 discussed above. The logic associated with each of the run states 350 is described in the associated table 362 of FIG. 3B.

Figure 4:
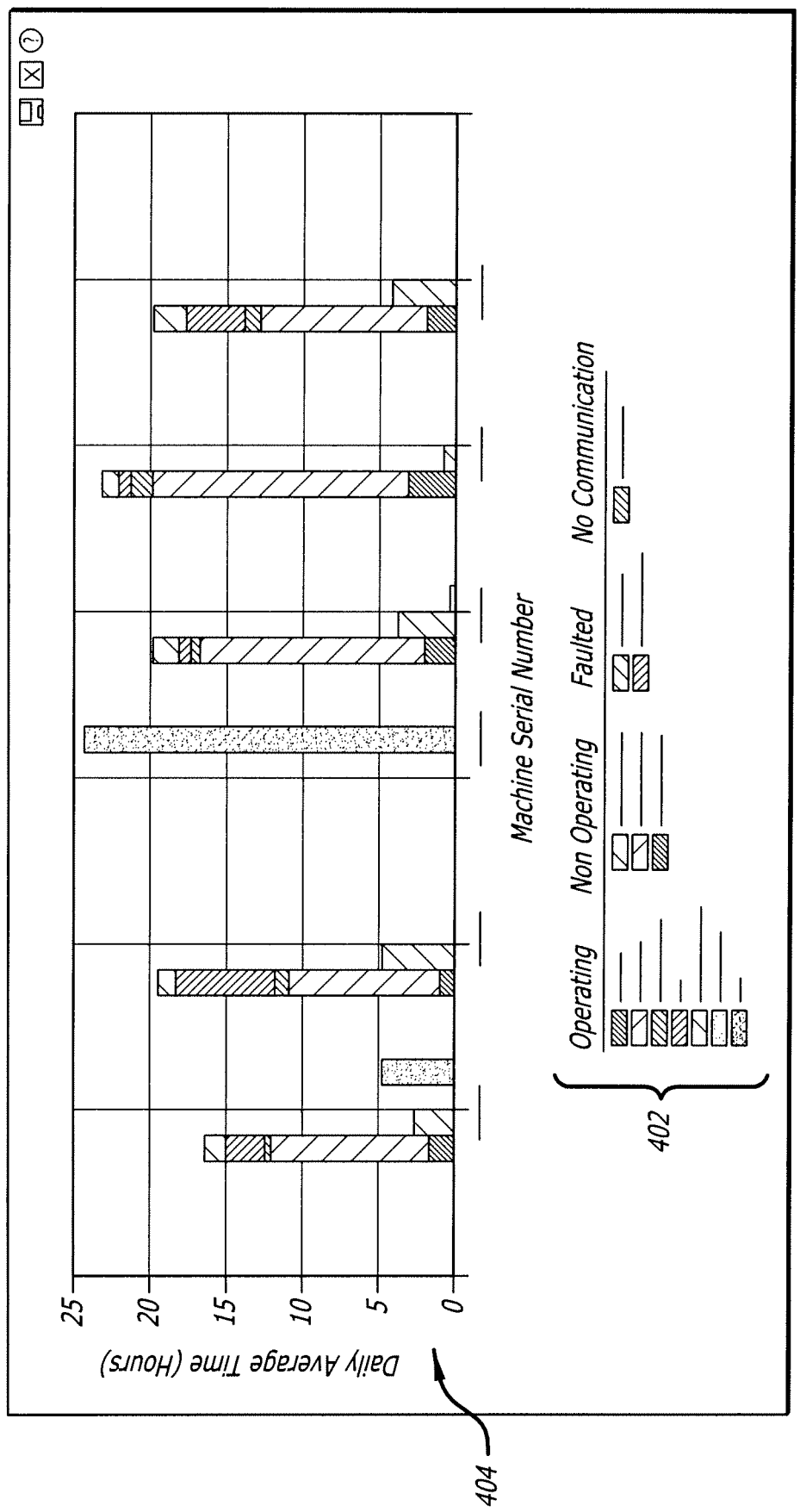
FIG. 4 is an exemplary screenshot illustrating a runtime distribution chart for a machine being monitored by the system of FIG. 1A.

FIG. 4 is an exemplary screenshot 400 from the web client display 126 illustrating a runtime distribution chart for a machine. The chart details the various types and amounts (e.g., daily averages 404) of activities 402 of each machine 128 in a fleet, and divides those activities 402 into the categories (e.g., operating, non-operating, faulted, no communication) of the uptime ratios 202 of FIG. 2. The chart allows users to view, for example, the amount and the type of abuses that a machine 128 has been subjected to over a period of time.

Figure 5:
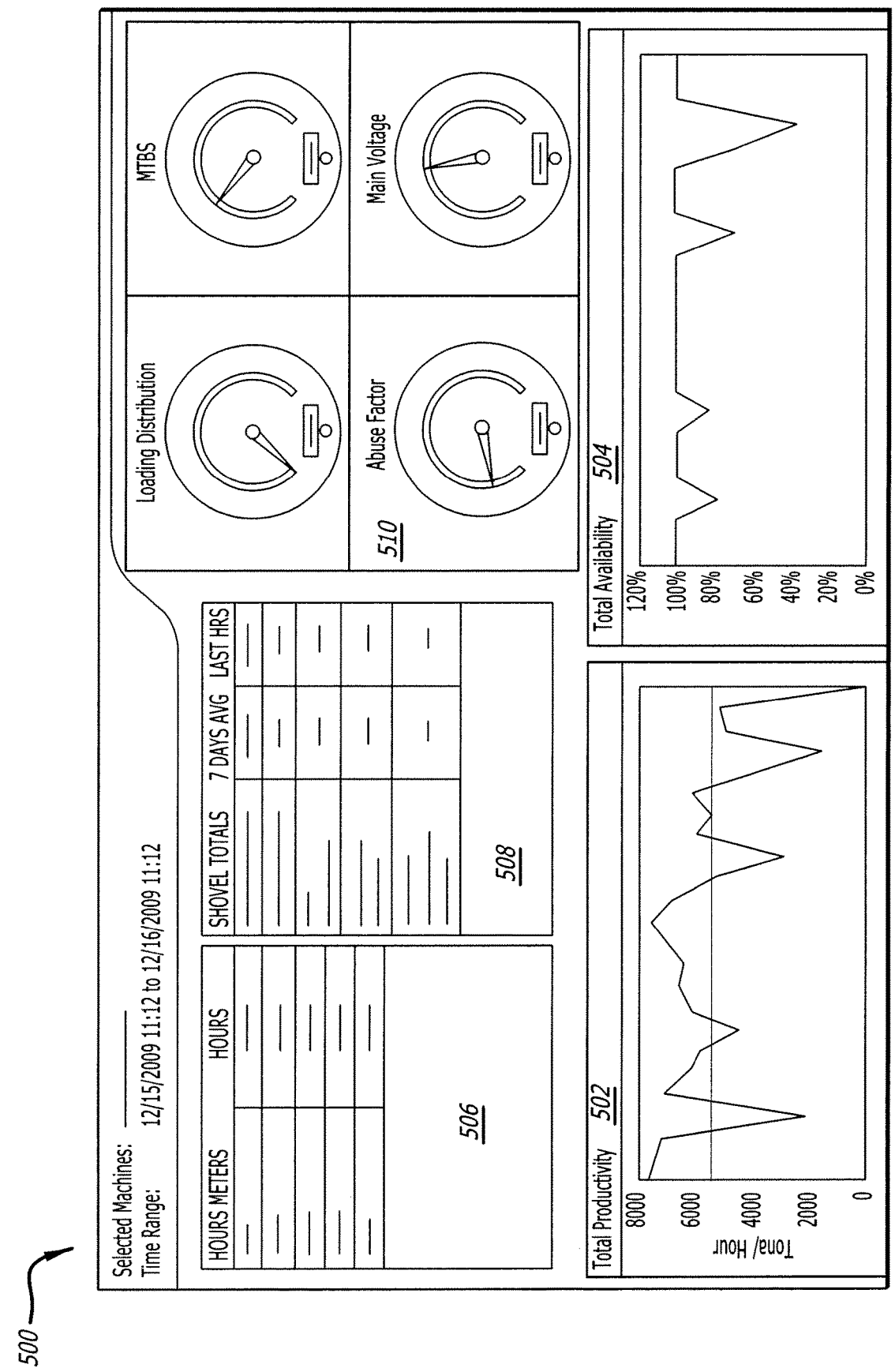
FIG. 5 is an exemplary screenshot illustrating productivity and other information for a machine being monitored by the system of FIG. 1A.

FIG. 5 is an exemplary screenshot 500 from the web client display 126 displaying productivity information for a machine 128 being monitored by the system 100 of FIG. 1A. The display includes total productivity information 502 and total availability information 504. In certain embodiments, productivity is obtained from the data 118 (e.g., payload data) of a machine 128. The display also includes various hour meters and totals for machines 128 in a fleet monitored by the system 100 of FIG. 1A. The display further includes an abuse factor 510 that displays an hourly average of abuse-related events (e.g., boom jacks, swing impacts, motor stalls and low voltage counts) for a selected machine 128 or an average value if multiple machines 128 have been selected.

Figure 6:
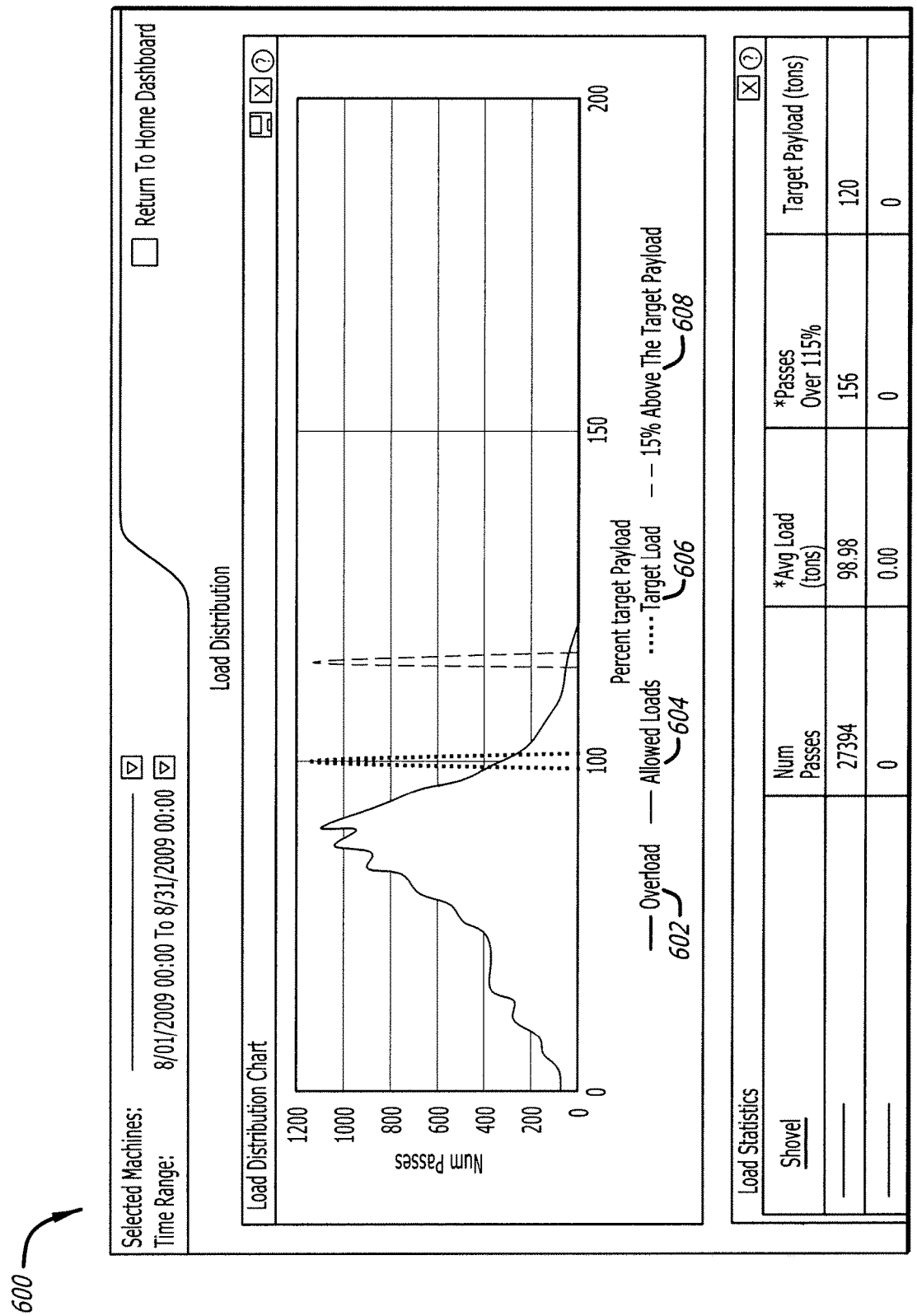
FIG. 6 is an exemplary screenshot illustrating load distribution for a machine being monitored by the system of FIG. 1A.

FIG. 6 is an exemplary screenshot 600 from the web client display 126 of the load distribution for various machines 128 in a fleet monitored by the system 100 of FIG. 1A. The load distribution (or "dipper load distribution") is, in certain embodiments, the distribution of total truck payloads for a machine 128 over a time period defined by a user. For example, loading distribution can be averaged for all machines 128 in a fleet. The illustrated x-axis is the percentage of rated load (e.g., dipper load where 100=rated load), where a user enters the target rated load for each machine 128. The load distribution includes information on overloads 602, allowed loads 604, target loads 606, and loads 15% above a target payload 608. A related loading efficiency can be calculated as 100 times the average dipper load, or as the measured payload divided by the target payload.

Figure 7:
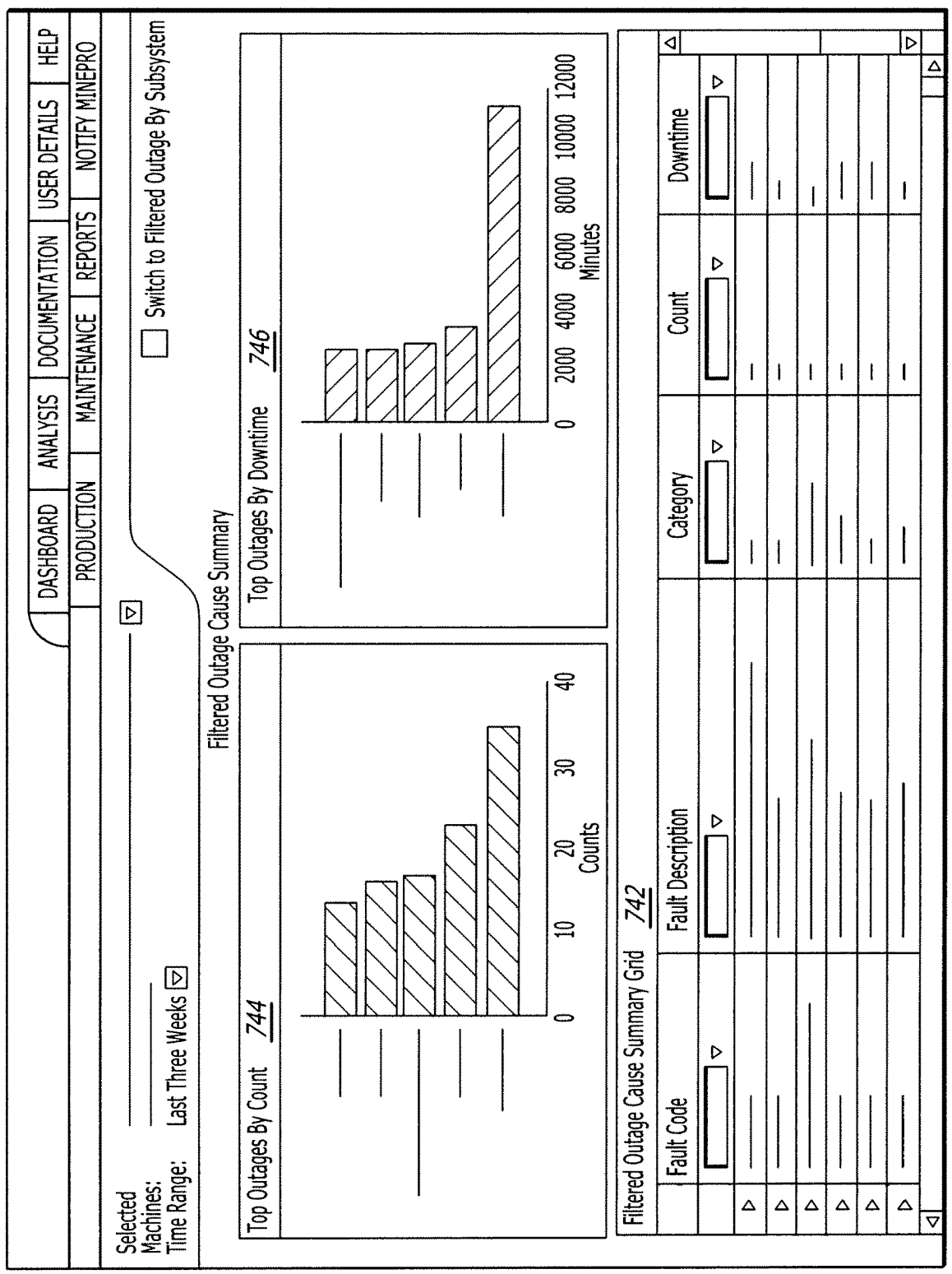
FIG. 7 is an exemplary screenshot illustrating information on outages for a machine being monitored by the system of FIG. 1A.

FIG. 7 is an exemplary screenshot 700 illustrating information on outages for a machine 128 being monitored by the system of FIG. 1A. The information includes the top outages by count 744 for a machine 128, the top outages by downtime 746 for the machine 128, and a filtered outage cause summary grid 742 for the machine. In certain embodiments, the information may include the count and downtime related to the most frequent faults within a user defined time period.

Figure 8:
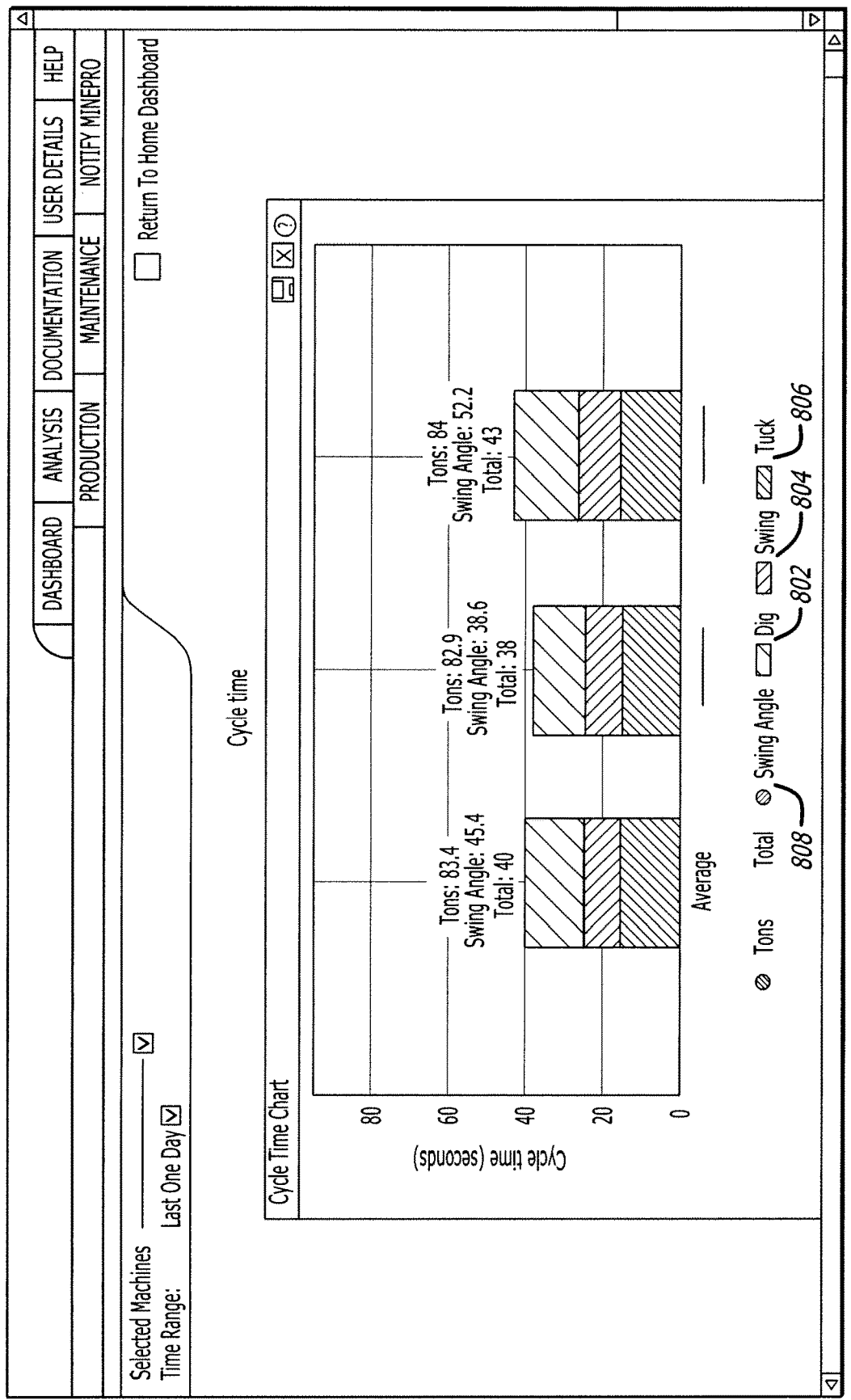
FIG. 8 is an exemplary screenshot illustrating cycle time performance information for a machine being monitored by the system of FIG. 1A.

FIG. 8 illustrates an exemplary screenshot 800 from the web client display 126 displaying information regarding cycle time performance. The shovel cycle time graph displays dig cycle time 802 in seconds, swing cycle time 804 in seconds, tuck cycle time 806 in seconds, and swing angle 808 for selected machines 128.

Figure 9:
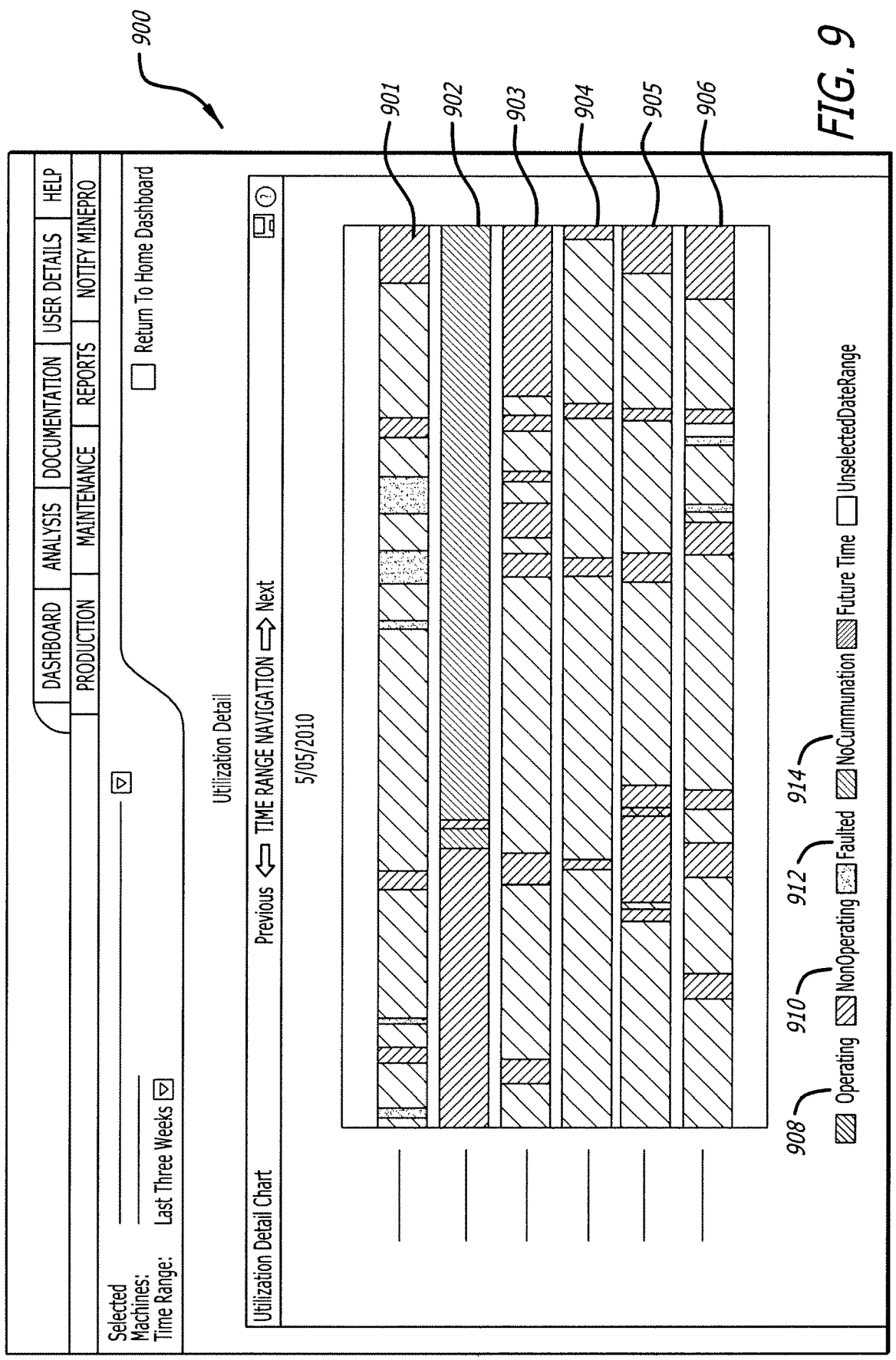
FIG. 9 is an exemplary screenshot illustrating availability history for a fleet of machines being monitored by the system of FIG. 1A.

FIG. 9 is an exemplary screenshot 900 illustrating availability history for a fleet of machines 128 being monitored by the system 100 of FIG. 1A. Specifically, the availability history of six machines 901, 902, 903, 904, 905, and 906 is displayed. The availability history for each of the machines 901, 902, 903, 904, 905, and 906 includes the time each machine 901, 902, 903, 904, 905, and 906 was operational 908, non-operational 910, faulted 912, or not in communication 914.

Figure 10:
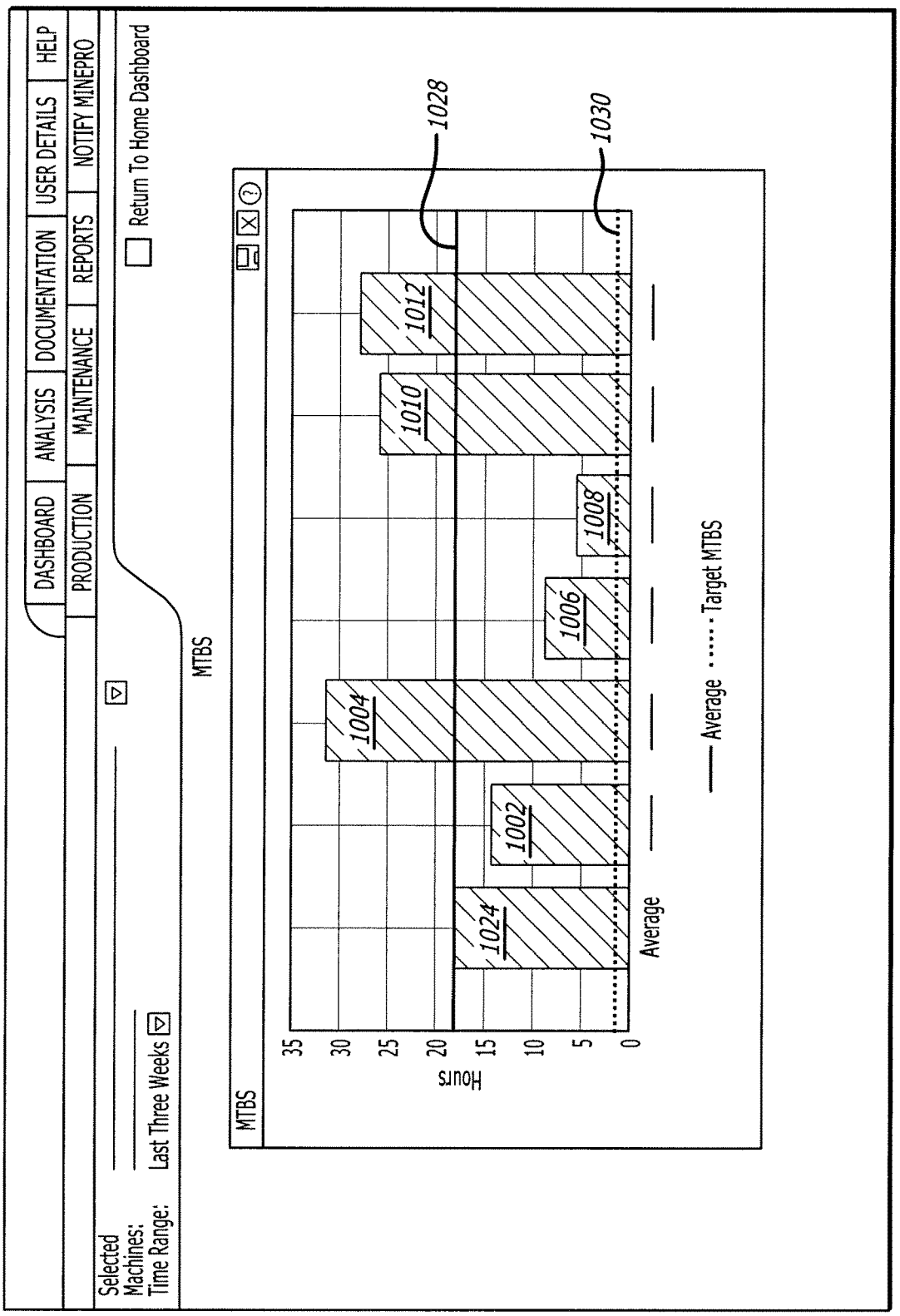
FIG. 10 is an exemplary screenshot illustrating time between shutdowns for a fleet of machines being monitored by the system of FIG. 1A.

FIG. 10 is an exemplary screenshot 1000 illustrating mean time between shutdowns (MTBS) for a fleet of machines 1002, 1004, 1006, 1008, 1010, and 1012 being monitored by the system 100 of FIG. 1A. In the example shown, six machines 1002, 1004, 1006, 1008, 1010, and 1012 have a time between shutdown value above both the average time between shutdown value 1028 of 18, and the target MTBS 1030. The average MTBS is also represented by the first bar 1024. In certain embodiments, the screenshot may include information on the mean time between shutdown of each individual machine 1002, 1004, 1006, 1008, 1010, and 1012 and the total mean time between shutdown of all machines 1002, 1004, 1006, 1008, 1010, and 1012 of a particular type. In certain embodiments, MTBS is based on total hours, where the formula is total hours divided by the number of episodes in the time period. In certain embodiments, the minimum time period for this calculation is seven days, and if the time period chosen by the user is less than 10 days, the system 100 will force a 10-day period for the calculation.

Figure 11:
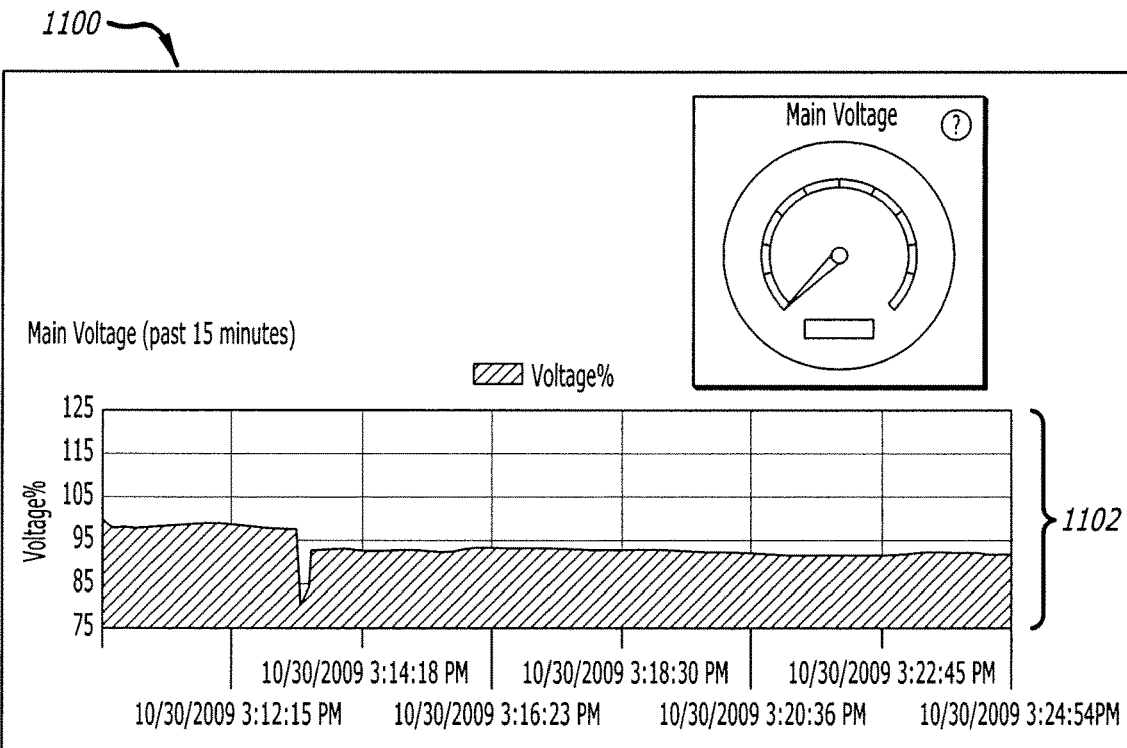
FIG. 11 is an exemplary screenshot illustrating a short term trend representing incoming voltage to a machine being monitored by the system of FIG. 1A.

Additionally, the system 100 is configured to associate certain information trends with faults. For example, certain trends in braking history are related to pneumatic faults, certain trends in lube pump history are related to lube flow faults, certain trends in crowd belt tension are related to pump faults, certain electrical drive trends are related to motor faults, and certain temperature trends are related to thermal faults. FIG. 11 illustrates an exemplary screenshot 1100 from the web client display 126 displaying one such trend, specifically, a short term trend 1102 representing incoming voltage (or power) to a shovel 128. The trend shows the value of the incoming power (in volts) to a machine related to its nominal rating of 100% over a 15-minute period.

Figure 12:
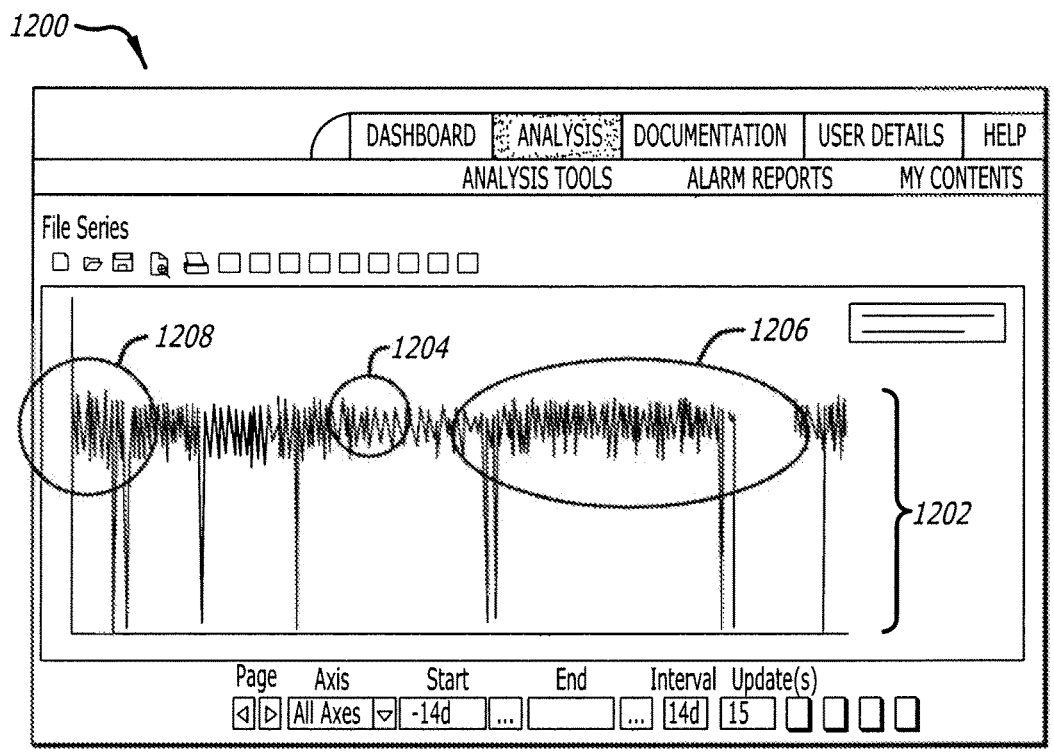
FIG. 12 is an exemplary screenshot illustrating a long term trend representing incoming voltage to a machine being monitored by the system of FIG. 1A.

FIG. 12 is an exemplary screenshot 1200 illustrating a long term trend 1202 representing incoming voltage (or power) to a machine 128. Specifically, the trend 1202 shows the value of the incoming power (in volts) to a shovel 128 related to its nominal rating of 100% over a two week period. The middle circle 1204 shows an area of the shovel 128 where the shovel 128 was likely powered up but idle (e.g., not digging). In that region the voltage regulation of the line is good, and very close to 100%. The rightmost circle 1206 shows a three day period in which the shovel 128 generally ran well. Of interest is the idle period at the left side of the circle 1206, and then the increase in variation of the signal as well as the shifting of the mean of the signal to around 95% as the shovel 128 is in operation. The leftmost circle 1208 shows a period in which the regulation is quite poor. There is a significant magnitude of variations, peaks, lows, and mean, which indicates that that the shovel 128 is likely to trip in many different ways (e.g., directly from undervoltage, symptoms of the poor regulation, etc.). By identifying these issues with the machine's 128 power, the machine user or owner can, for example, be given prior warning that certain actions may cause the machine to begin to trip.

Figure 13:
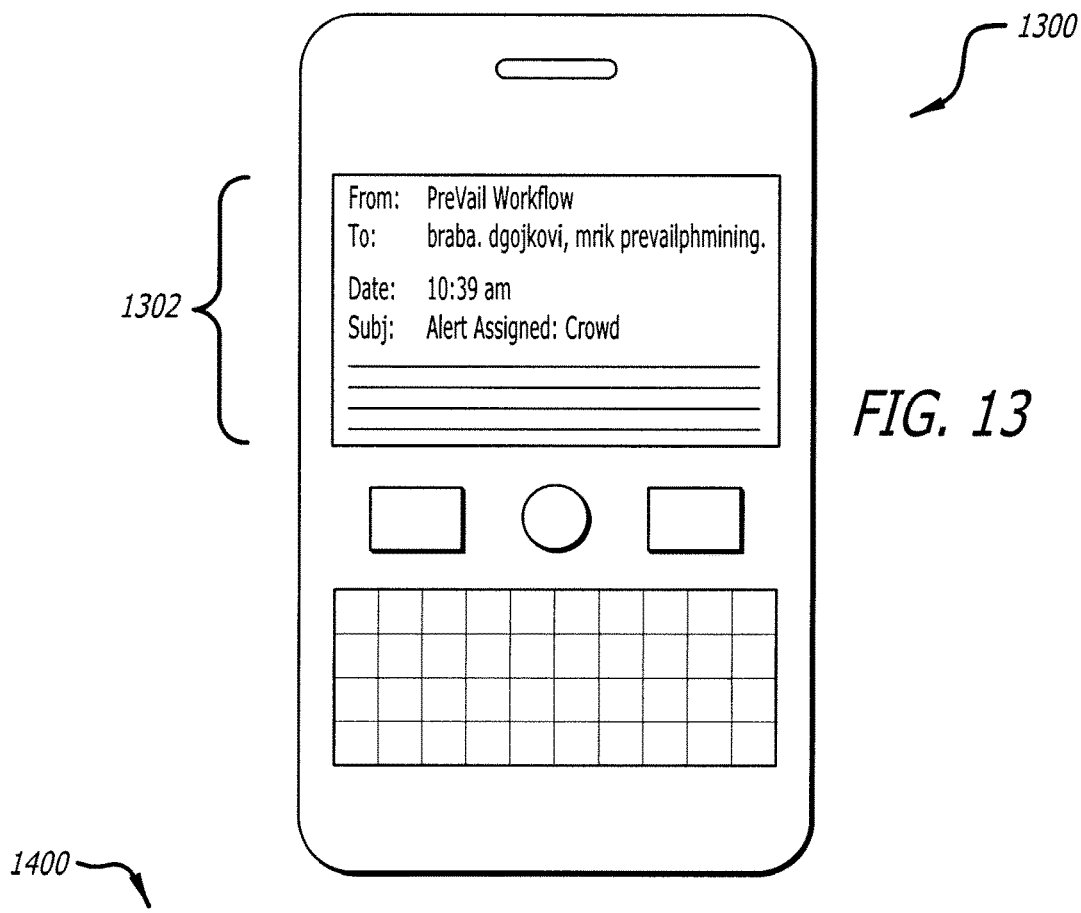
FIG. 13 is an exemplary mobile device displaying information formatted for a mobile device using the system of FIG. 1A.

FIG. 13 is an illustration 1300 of an exemplary mobile device displaying information 1302 formatted for the mobile device. As part of the workflow tools provided by the system 100, the system 100 provides information to mobile users that allows for automated escalation, instantaneous notifications that are user configurable, and user definable events.

Figure 14:
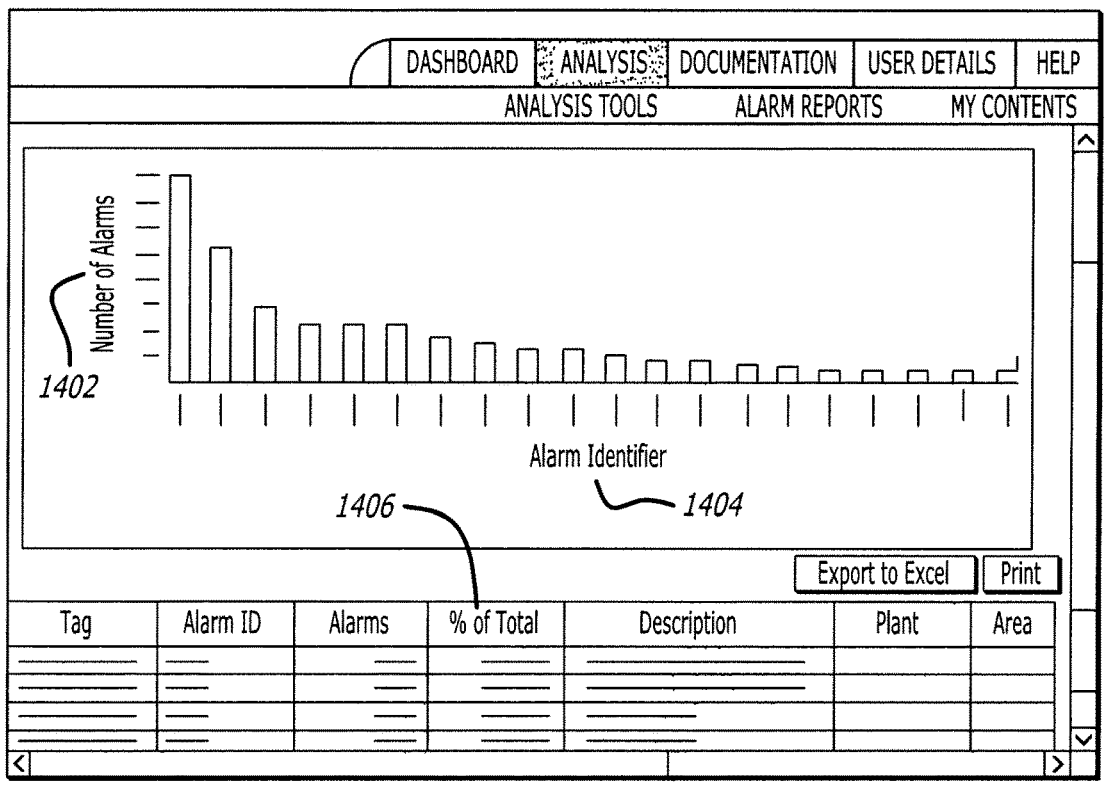
FIG. 14 is an exemplary screenshot illustrating alarm information for a fleet of machines being monitored by the system of FIG. 1A.

FIG. 14 illustrates an exemplary screenshot 1400 from the web client display 126 displaying workflow tools configured to provide information and reports directly to users. Specifically, information on alarms, such as the number 1402 of alarms, types 1404 of alarms, and locations 1406 of alarms is displayed. Information on incidents, events, equipment, and escalation can also be provided. The workflow tools are also configured to provide information on event management, work order generation, and historical records.

Figure 15:
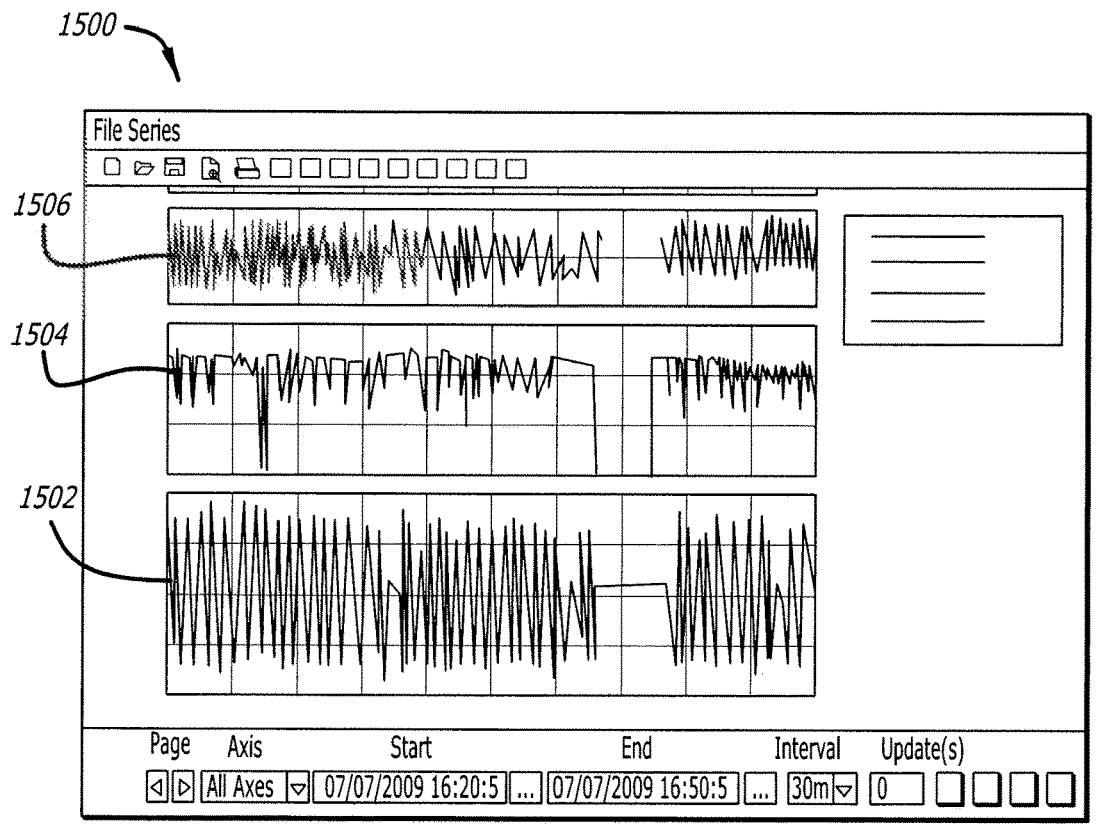
FIG. 15 is an exemplary screenshot illustrating in-depth fault analysis for a fleet of machines being monitored by the system of FIG. 1A.

FIG. 15 is an exemplary screenshot 1500 illustrating in-depth fault analysis for a fleet of machines 128 being monitored by the system 100 of FIG. 1A. The analysis includes trend data on machine volts 1502, amps 1504, and revolutions per minute 1506 over time for at least one machine 128 monitored by the system 100 of FIG. 1A. The display can be further configured to display user defined trends, remote analysis, issue diagnosis, and preemptive analysis.

Figure 16:
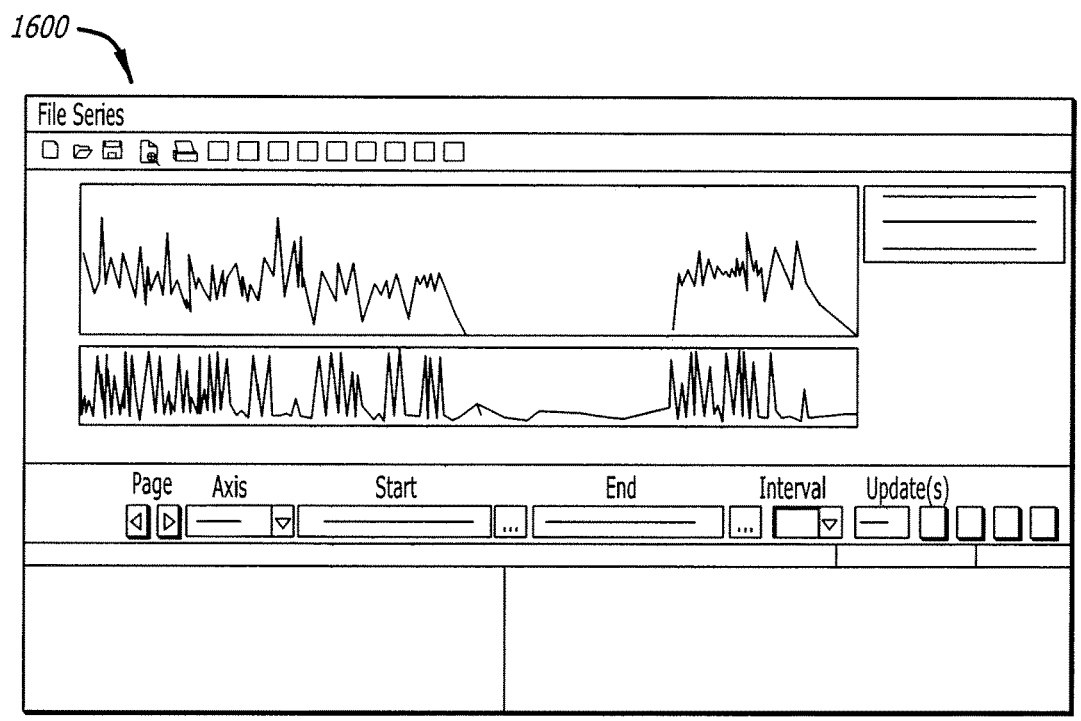
FIG. 16 is an exemplary screenshot illustrating a historic analysis of temperatures for a fleet of machines being monitored by the system of FIG. 1A.

FIG. 16 is an exemplary screenshot 1600 illustrating a historic analysis of temperatures for a fleet of machines 128 being monitored by the system 100 of FIG. 1A. The display of FIG. 16 can be further configured to provide additional information, such as information on motor data, fault data, and sensor data, and it can leverage historical data to substantiate predictions. For example, the system 100 includes algorithms for automatically detecting and identifying failures, such as a failure related to weak crowding. As another example, the system 100 can configure the display of FIG. 16 to identify current prognostic indicators, using special odometers (e.g., for drills, cable life, brake life, and motor life) in order to warn of impending failures (e.g., a bearing failure). As another example, the system 100 can configure the display of FIG. 16 to identify measurements that correspond to relevant condition predictors of motors, such as, but not limited to, motor loading (e.g., over time or in various cycles), drive thermal calculations (e.g., to give an indication of the historical motor loading), motor energy and work calculations (e.g., calculating the amount of work/ energy done by the motor, taking into account any stall conditions, using values such as torque, RMS current, power, RPM, etc.), commutation stress (e.g., the level of commutation stress experienced by the motor over time and in various cycles) such as rate of current change, thermal information (e.g., how heat effects the condition of the motor) such as thermal cycling (e.g., the level of thermal cycling by tracking total changes in temperature over time) and rise above ambient (e.g., measuring total temperature rise over ambient, sensor(s) to be used, interpole, and/or field), and hard shutdowns (e.g., track, by motion, the number of hard shutdowns, categorized as instant shutdowns or drive trips to the system, and use a weighting system to aid in the quantification of those affects on motor condition).

Figure 17:
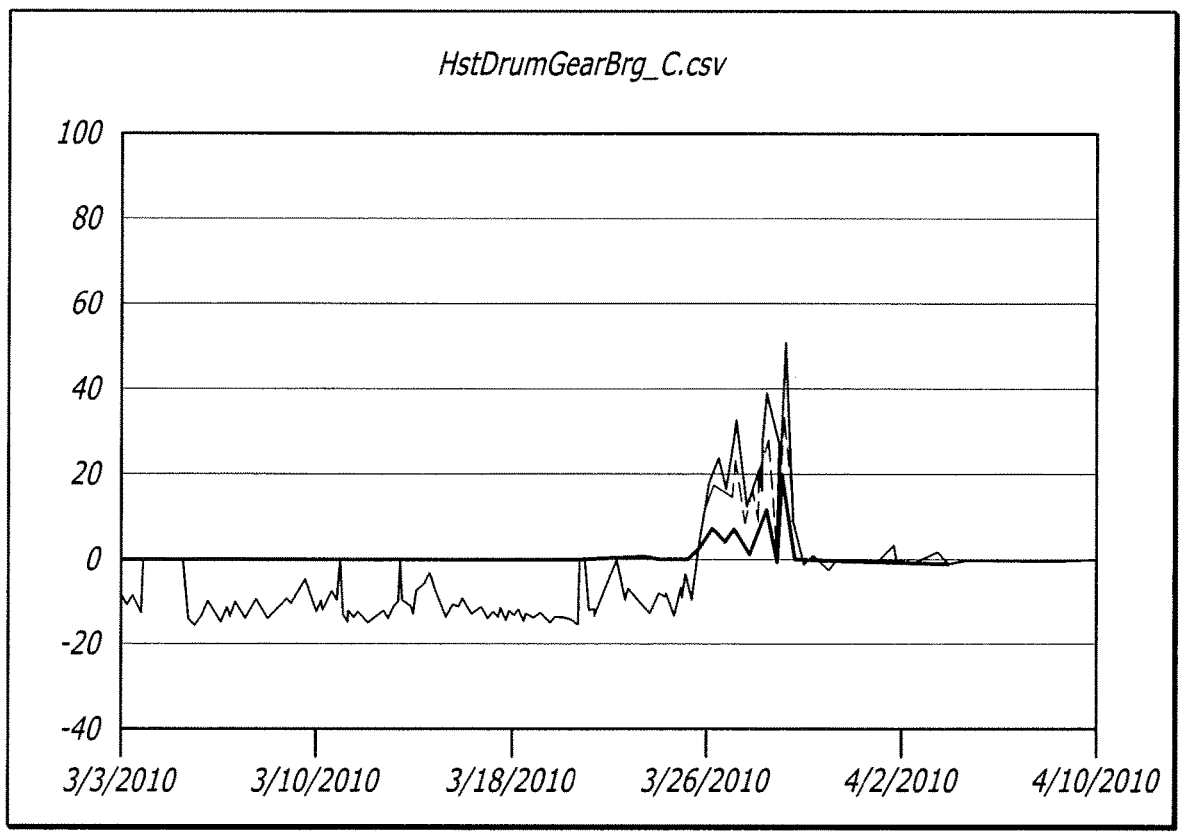
FIG. 17 illustrates an exemplary screenshot of a normal trend between two bearings on a hoist drum of a machine being monitored by the system of FIG. 1A.

FIG. 17 is an exemplary screenshot 1700 of a normal trend between two bearings on a hoist drum machine 128 that progressed to a failure, causing an alert to be generated. In certain embodiments, an alert (or "trigger") is generated based on any combination of (a) a range exceeding a predetermined value, (b) if the temperature difference between two components is positive (e.g., the difference is normally negative, so a positive difference may indicate a problem, such as a side stand bearing problem), and (c) if the temperature difference falls below a predetermined negative value (e.g., indicating a problem, such as a drum gear bearing problem). An alert may be issued in the form of a communication, such as an email or text message to a user. An alert can have states, such as open, accepted, resolved, or ignored, and can include information such as machine identification, time, associated user, and status.

Figure 18A:
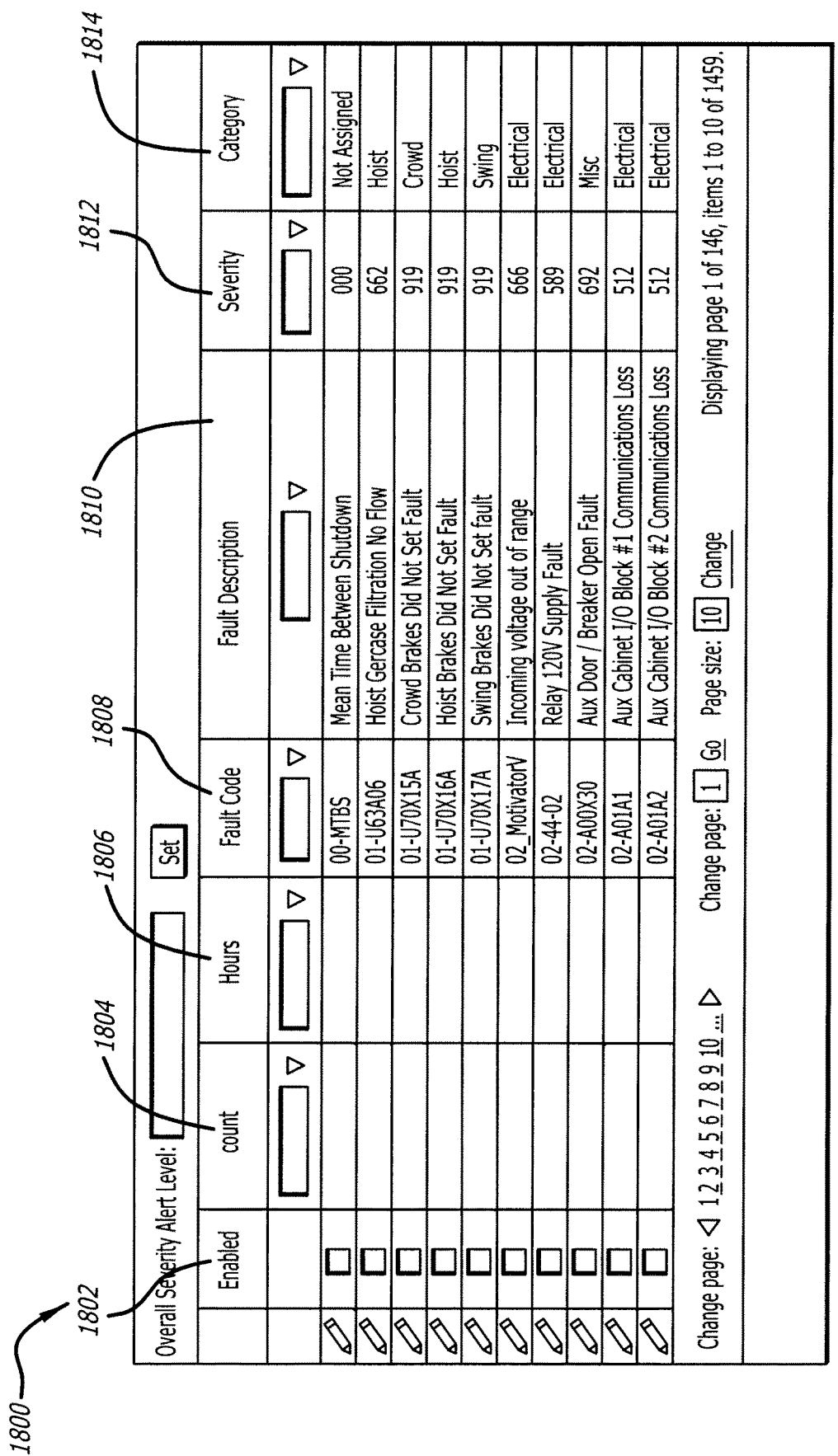
FIG. 18A illustrates an exemplary screenshot for configuring alert communications using the system of FIG. 1A.
Figure 18C:
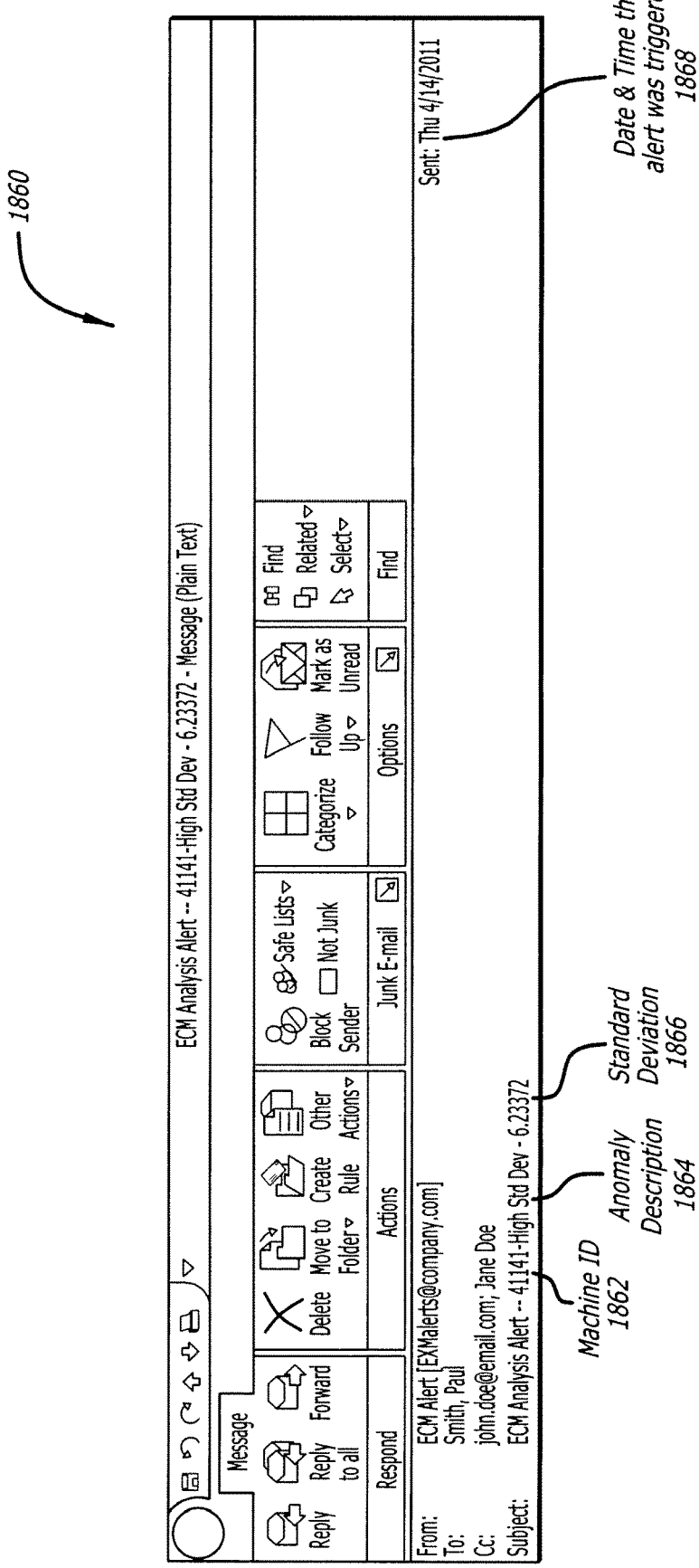
FIG. 18C illustrates an exemplary screenshot for an alert communication communicated by the system of FIG. 1A.

Alerts can be configured by a user, as illustrated in the exemplary screenshot 1800 of FIG. 18A. Alerts that are configured by a user are considered manual alerts. Alerts that are previously configured to be communicated by the system 100 are considered automatic alerts. Manual alerts can be generated based on a particular fault, or on issues that might not be automatically generated by the system 100 (e.g., a crack in the boom). In certain embodiments, manual alerts can be enabled 1802 based on any combination of count 1804, hours 1806, fault code 1808, fault description 1810, severity 1812, and category 1814. Similarly, in certain embodiments, automatic alerts can be issued if the severity weight of an event is above a certain threshold, for example, 800; if the code of an event is above a level set by the user for a particular machine; if an event occurs at or above a user-defined level of frequency within a given timeframe; or, if the calculated value of an MTBS alert level for the past week is less than or equal to the MTBS alert level set by a user. In certain embodiments, duplicate alerts are removed. For example, if an alert is set to be sent 3 times in 4 hours, after the first alert is sent no other alerts should be sent until another 3 in 4 hour pattern is observed in the incoming data. As another example, if several users create an alert definition for a particular machine and a fault/severity, and if a matching fault/severity occurs, only one alert will be sent. Data regarding the alerts that have been sent by the system 100 can be stored in the system memory 106, and optionally viewed, as illustrated in FIG. 18B, an exemplary screenshot 1850 of a history of alerts communicated by the system 100. FIG. 18C illustrates an exemplary screenshot 1860 for a predictive model message alert communication communicated by the system of FIG. 1A. The predictive model is discussed in more detail below with reference to FIG. 20B. The exemplary screenshot 1860 illustrates an email received by a user at a web client 124 associated with a machine 128. The email includes an identification 1862 of the machine 128, a description of an anomaly 1864 associated with the machine 128, a standard deviation 1866 associated with the anomaly 1864, and a date and time at which the alert was triggered 1868. The email indicates that the mains voltage on the machine 128 is in significant fluctuation with a standard deviation of 6.23372.

Figure 19A:
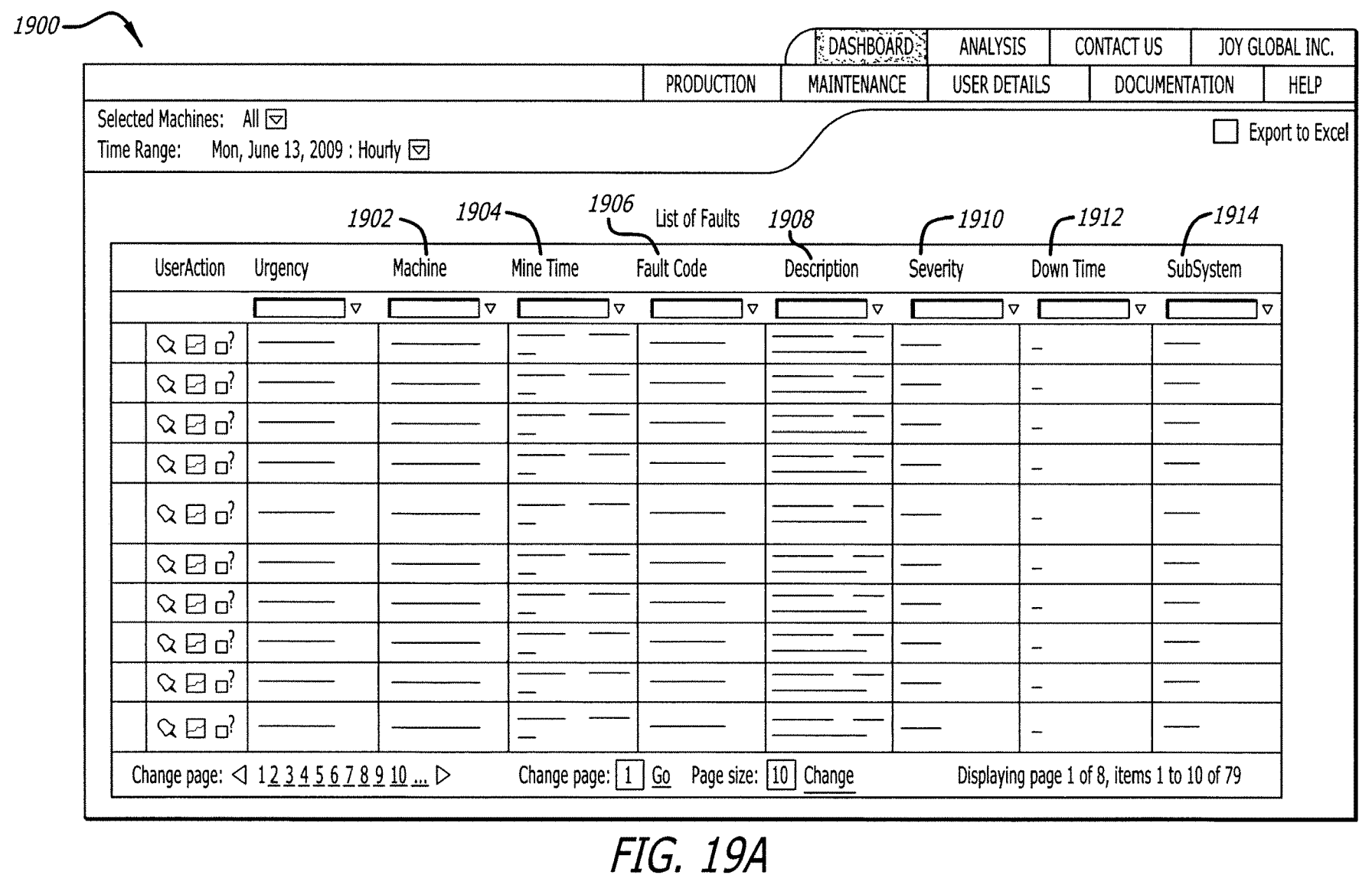

FIG. 19A illustrates an exemplary screenshot 1900 of a list of faults of a machine 128 being monitored by the system of FIG. 1A. The faults detail sequences of events of record. In one embodiment each listed fault is associated, by column, with a machine 1902 on which the fault took place, the time 1904 at which the fault took place, a fault code 1906 associated with the fault, a description 1908 associated with the fault, a severity weight 1910 associated with the fault, a downtime value 1912 associated with the fault, and the subsystem 1914 with which the fault relates. The columns may be sorted according to a user's preferences. For example, the time column can be sorted to show the latest faults at the top of the listing.

In certain embodiments, the severity weight is based on a weighting that includes: (1) a safety value associated with each of the faults, (2) a position in a logical and/or physical hierarchy associated with each of the faults, (3) an estimated time of repair associated with each of the faults, and (4) an estimated cost of repair associated with each of the faults. For example, as illustrated in FIG. 19B, which illustrates exemplary weighting determinations 1920 for various faults identified by the system 100 of FIG. 1, the "Emergency Stop Pushbutton Fault" fault 1922 has a severity weight of 769.

In FIG. 19B, the "Emergency Stop Pushbutton Fault" severity weight 1940 of 769 is equal to the sum of the safety rank 1924 of 3 times the safety weight 1932 of 180, the hierarchy rank 1926 of 2 times the hierarchy weight 1934 of 77, the downtime rank 1928 of 1 times the downtime weight 1936 of 38, and the cost rank 1930 of 1 times the cost weight 1938 of 37. In certain embodiments, the rank values 1924, 1926, and 1928, weight values 1932, 1934, and 1936, and weighting determinations 1940 can be determined using other methods.

Figure 19C:
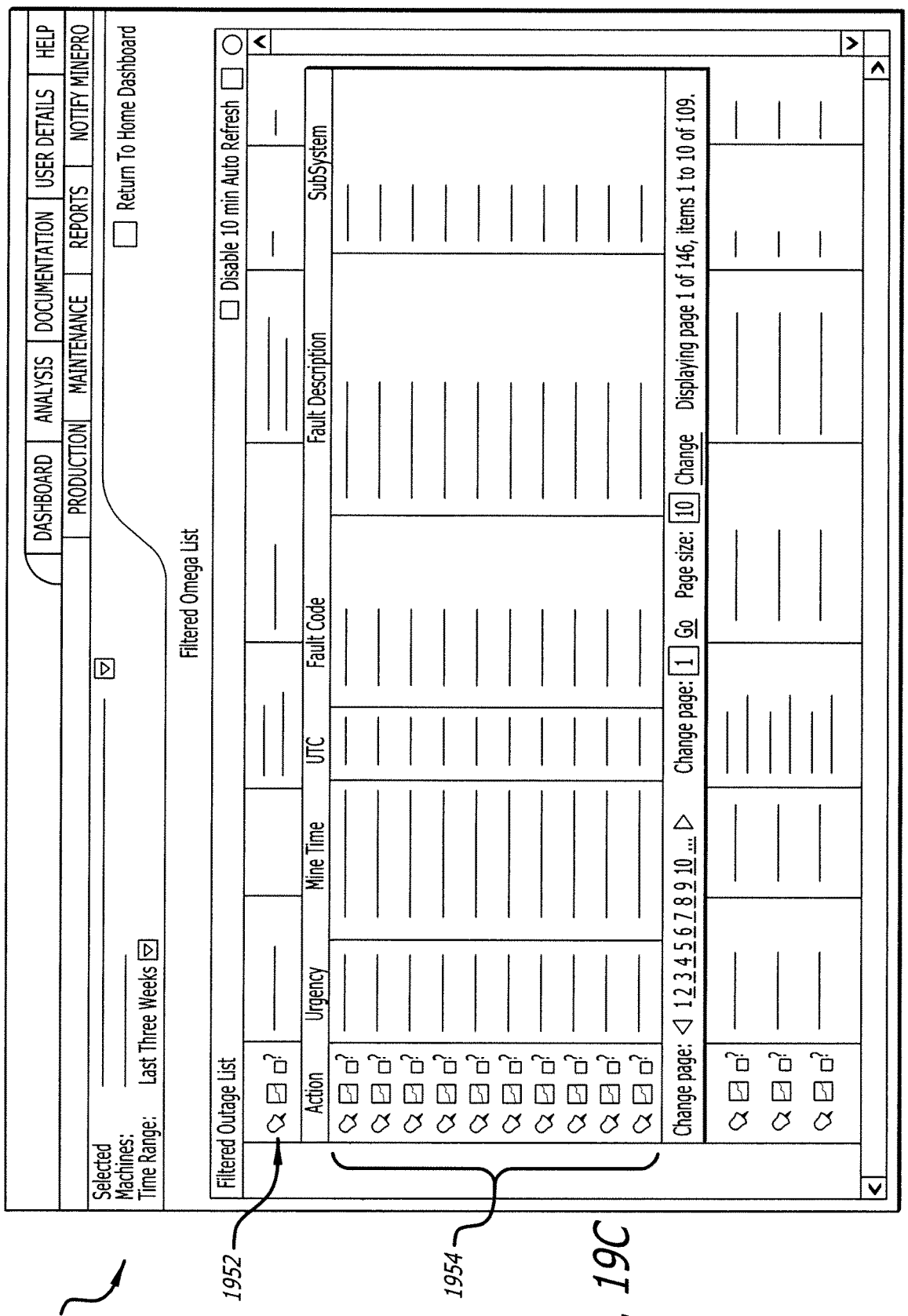
FIG. 19C illustrates an episode of events for a machine being monitored by the system of FIG. 1A.

FIG. 19C illustrates an episode of faults 1950 for a machine being monitored by the system of FIG. 1A. In certain embodiments, faults are grouped based on the approximate time at which they occur. For example, if several faults occurred within a 30-second time period, those events would be grouped together (as a "group" or "episode"). The fault having the highest severity weight from the episode would be considered the "parent" fault, and the remaining faults would be considered the "children" faults. For example, the parent fault (e.g., the most severe fault in an episode) is the fault with the highest severity weight that occurred within 15 seconds of the first fault in the episode. With reference to FIG. 19C, the "Hoist Arm contactor aux contact did not close" 1952 is the parent fault because it has the highest severity weight of 840, while the remaining faults 1954 are its children faults because they have lower severity weight values (not illustrated). In certain embodiments, the duration for collecting faults for an episode will be calculated from the first fault to the time a normal start occurs (e.g., Started In Run condition) or when a no communications message is issued.

Figure 19D:
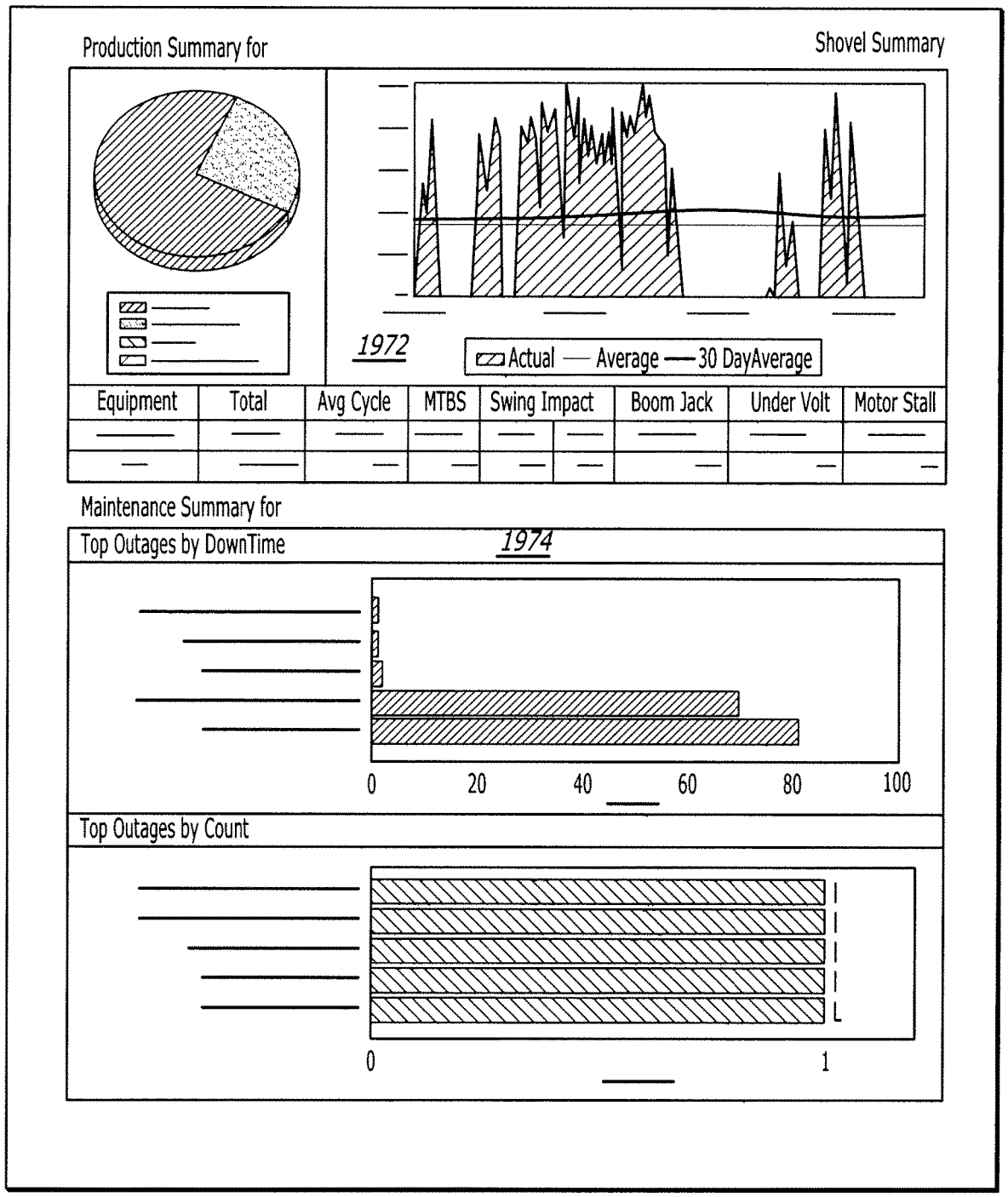
FIG. 19D illustrates an exemplary report output by the system of FIG. 1A.

In addition to the reports and exemplary screenshots discussed above, the system 100 is configured to provide reports (with or without illustrations) that include information such as, but not limited to, cycle time analysis, average cycle time, tonnage summary, total tons shipped, average tons per hour, total bench c/yards, average bench c/yards per hour, loading efficiency, and machine hours. The information may further include uptime ratio, availability summary, machine availability breakdown, percentage of availability, mean time between shutdown, fault summary, and fault distribution (e.g., the top 5 or 10 faults). The information may yet further include the date/time of relevant machine faults, recent faults and descriptions, category of events, trend of relevant data tags (e.g., as defined by a system administrator), link to enter/display annotations, and information on how to promote an event to an alert. The information may also include a list of most current faults/alarms, trend information with user defined associations, machine identification, run status, ladder status, and machine hours (e.g., run, hoist, crowd, swing, propel). The information may yet further include average cycle time, current cycle time, current dipper load, total shipment tonnage, boom jacks, swing impacts, faults, abuse factor, loading efficiency, main voltage level, shovel tons per hour, yards per day, average shovel cycle time, total tons moved, and total yards moved. For example, the exemplary report 1970 for a shovel 128 illustrated in FIG. 19D provides information related to uptime 1972 and outages 1974.

For machines 128 such as drills, the information may also include average hole-to-hole cycle times that is divided up into the individual drilling process components, the number of holes drilled with an auto drill, manually, or a combination, the total footage drilled and feet drilled per hour by each drill at a site, with information identified by machine, over time, so that the data can be compared. The information may also include the total number of holes drilled, average number of holes drilled per day and hour, total footage drilled, average feet drilled per drilling hour, total drilling hours, average drilling hours per day, hole-to-hole cycle time, and average cycle time. The information may also include the number and type of exceptions encountered during machine use, the machine effort, footage, start/end time, total time to complete a task, total depth, average penetration rate, total effort, total exception count, pull down, penetration rate, torque, vibration, revolutions per minute, weight on a bit, air pressure, and whether an auto drill was on or off.

In addition to the analyses discussed above, the analysis tools of the system 100 are further configured to provide integrated schematics, integrated parts references, annotation history, and RCM enablement.

Figure 20A:
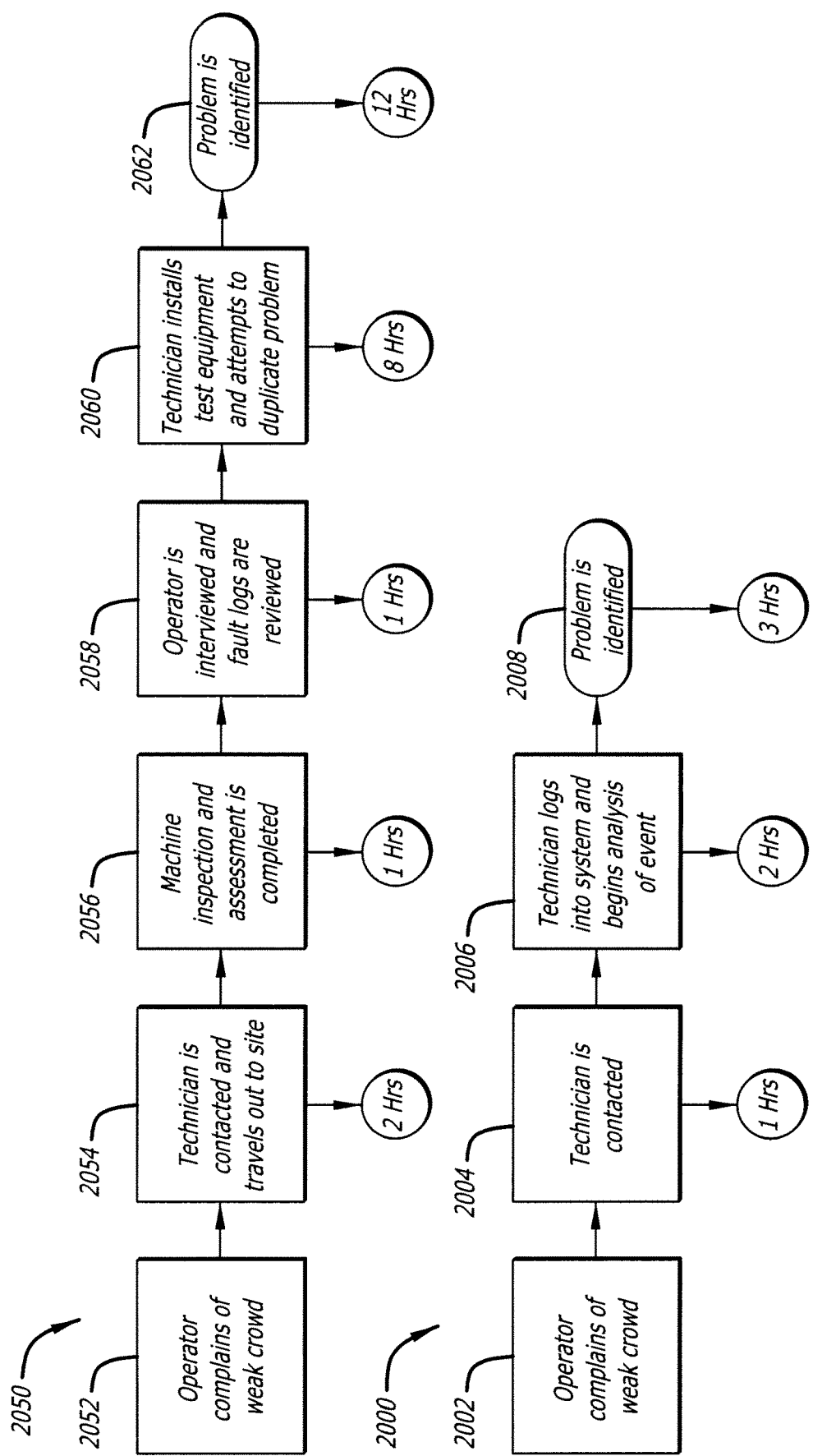
FIG. 20A illustrates a comparison of exemplary workflows between the system of FIG. 1A and the prior art.

FIG. 20A illustrates a comparison between an exemplary workflow 2000 of the system 100 of FIG. 1A and an exemplary workflow 2050 of a prior art system. Specifically, process 2050 illustrates a workflow for troubleshooting a weak crowd problem according to the prior art, while process 2000 illustrates a workflow troubleshooting a weak crowd problem according to certain embodiments of the server system 100.

The prior art process 2050 begins in step 2052, where a machine operator observes: (a) a weak crowd problem on a machine 128; (b) that no faults are present at the time of the complaint; and, (c) that the weak crowd problem is intermittent. In step 2054, a maintenance technician is contacted and travels to the site of the machine 128, which takes about two hours. In step 2056, a machine inspection and assessment is completed in about one hour. In step 2058, the operator is interviewed and fault logs for the machine 128 are reviewed, taking approximately one hour. In step 2060, the maintenance technician installs test equipment and attempts to duplicate the problem, which takes about 8 hours. Finally, the problem is identified in step 2062. The entire prior art process 2050 takes, on average, about 12 hours.

Figures 21A, 21B:
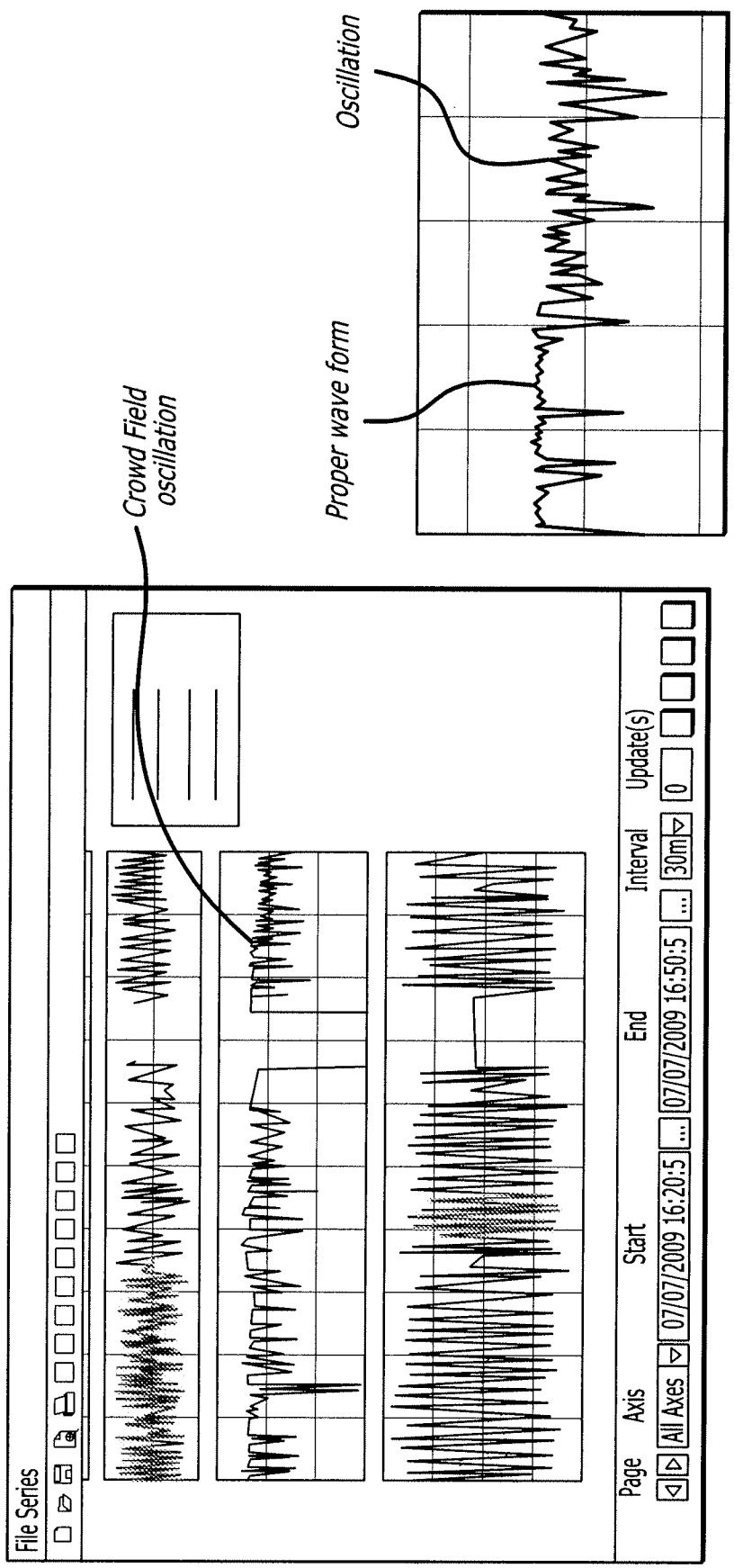
FIG. 21A is an exemplary screenshot identifying crowd field oscillation on a machine being monitored by the system of FIG. 1A and FIG. 21B more clearly illustrates the crowd field oscillation.

The process 2000 as disclosed herein according to certain embodiments similarly begins in step 2002, where an machine operator observes: (a) a weak crowd problem on a machine 128; (b) that no faults are present at the time of the complaint; and, (c) that the weak crowd problem is intermittent. In step 2004, a maintenance technician is contacted, which takes about one hour. In step 2006, the maintenance technician logs into the machine client 110 (in FIG. 1) and begins analyzing any events in the data 118 (in FIG. 1) associated with the weak crowd problem, taking about two hours. As illustrated in FIG. 21, the maintenance technician is able to determine that the amp reading from the data 118 for the machine 128 displays crowd field oscillation (e.g., a proper wave form followed by oscillation). The maintenance technician, having analyzed the data 118, identifies the problem in step 2008. The entire process 2000 takes, on average, about 3 hours, or about 25% of the time averaged by the prior art process 2050. The process 2000, having saved significant time, allows a problem to be identified before the machine 128 fails, which allows for part replacement with minimal downtime (which is related to cost savings) and validation of the machine operator's awareness in change in performance.

The system 100 for remotely monitoring equipment disclosed herein advantageously allows for reductions in Mean Time To Repair (MTTR), unplanned downtime, and operations and maintenance costs. The system 100 further allows for improvements in Mean Time Between Failure (MTBF), availability, reliability, maintainability, operating and maintenance efficiencies, optimization of fleet maintenance and operations, responsiveness to faults, parts and inventory planning, and competitiveness and profitability. Productivity, shovel performance, and data analysis tools are also provided.

Figure 20B:
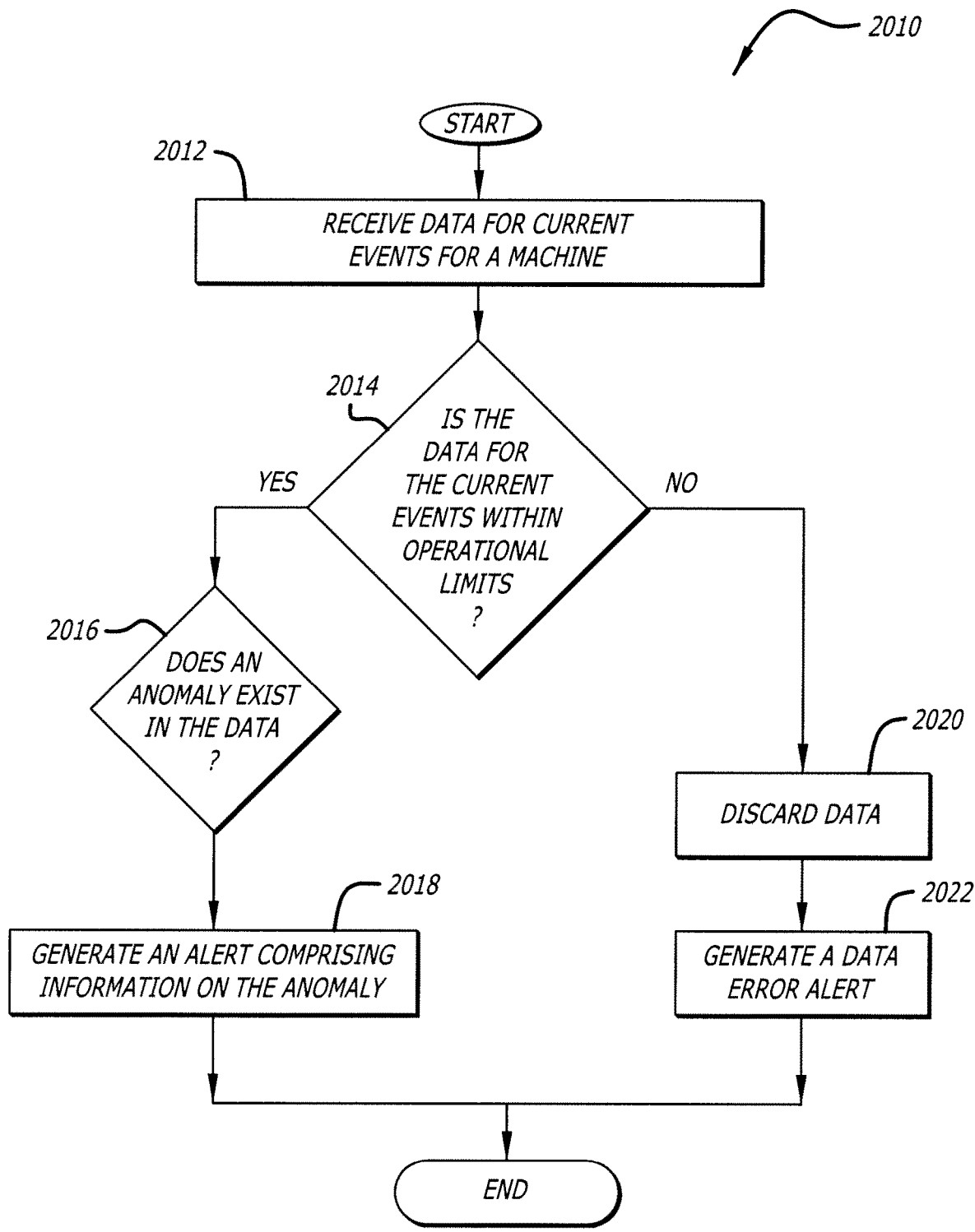
FIG. 20B illustrates an exemplary workflow for predicting a machine event using the system of FIG. 1A.

As a complement to the process 2000 of FIG. 20A, FIG. 20B illustrates an exemplary workflow 2010 for predicting a machine event using the system 100 of FIG. 1A. In certain aspects, the workflow 2010 is referred to as the "predictive health" of the machine 128.

The workflow 2010 begins in step 2012, where current event data 118 (e.g., data within the past few minutes or some other relevant time period) for a machine 128 is received by the server system 100. In certain aspects, the workflow 2010 determines whether the current event data 118 is available before attempting to receive the data. In decision step 2014, it is decided whether the data is within operational limits. In certain aspects, the data for the current events is compared with a predetermined physical range for the operation of the machine in order to determine whether the data is within operation limits. For example, if the data indicates a temperature outside the range of −50 degrees Celsius to 200 degrees Celsius, a range beyond which a physical element of a machine or component of a machine is unlikely or may even be impossible to function, then it is likely that the received data is erroneous data. The operational limit that is considered will vary with the component being analyzed. Thus, if it is decided in decision step 2014 that the data 118 is not within operational limits, the data 118 is discarded in step 2020 and a data error alert is generated in step 2022 to inform a user that the data 118 being received for the machine 128 is erroneous. The user can then, for example, take action to correct the transmission of the data 118.

If it is decided in decision step 2014 that the data 118 is within operational limits, then the workflow 2010 proceeds to step 2016 in which it is determined whether the data indicates the existence of an anomaly. The existence of an anomaly can be determined by comparing current events from the data 118 for the machine 128 with past events for the machine 128, or with expected or historical results, to determine whether an anomaly exists. The existence of an anomaly can also be determined by comparing current event data 118 for one portion of the machine 128 with current event data 118 for a related portion of the machine 128 to determine whether the anomaly exists.

Various anomaly detection techniques can be used for these comparisons. For example, certain techniques include identifying an anomaly using thresholds and/or statistics. Various statistical considerations include frequencies, percentiles, means, variances, covariances, and standard deviations. For example, if the current temperature for a part on the machine 128 is at least one standard deviation away from the average past temperature for the machine 128, then an anomaly is identified. Rule-based systems can also be used (e.g., characterizing normal machine 128 values using a set of rules and detecting variations therefrom). Another anomaly detection technique is profiling (e.g., building profiles of normal machine 128 behavior and detecting variations therefrom). Additional anomaly detection techniques include model based approaches (e.g., developing a model to characterize normal machine 128 data and detecting variations therefrom), and distance based methods (e.g., by computing distances among points).

As another example, if the current event data 118 includes temperature information for at least one portion (e.g., a component) of the machine 128, then the temperature of the portion of the machine 128 can be compared to a predetermined temperature range for that portion, or the temperature of another similar or identical portion of the machine 128 to determine whether the anomaly exists for that portion or another portion of the machine. Similarly, if the current event data 118 includes voltage information, speed information, or count information for a portion of the machine 128, then the voltage information, speed information, or count information for the portion of the machine 128 can be compared with a predetermined range of voltage information, speed information, and count information for that portion to determine whether an anomaly exists. Other types of current event data 118 that can be compared with a predetermined range can include electric current data, pressure data, flux data, power data, reference data, time data, acceleration data, and frequency data.

Several examples of models will now be presented that can be used for determining whether current event data 118 indicates the existence of an anomaly. A first example relates to the identification of crowd belt tensioning. A key criterion to identify a crowd belt on a machine 128 being too tight is the temperature on the crowd motor drive end. As the tension in the crowd belt increases, it will hinder the free motion of the crowd input end sheave, and an increase in the drive end temperature would be expected. In a normal working scenario, both the bearings at the drive end and non-drive end of the crowd motor are correlated. Due to a crowd belt being too tight, an external force develops on the crowd motor input sheave that will create a torque on the armature shaft, resulting in a sharp raise in the drive end bearing temperatures as compared to the non-drive end bearing temperature. A frequent crowd drive end overheating is a prime indicator of either the crowd belt being too tight, or the armature shaft not being aligned properly, which is a result of a tangential force applied to the one end of the shaft. Thus, in certain embodiments, a model monitors the relative temperature between crowd bearing and a cross-correlation between bearing temperatures and the crowd belt tension on a predetermined schedule (e.g., every 30 minutes) and identifies an anomaly when bearing temperatures increase more than three standard distributions.

A second example includes a voltage model. Mines often have power distribution issues where the line voltage fluctuates beyond that of the machine specification. During times of voltage dips, excessive voltage, equipment failure or poor power quality, commutation faults can lead to inversion faults. For instance, a machine 128 often has extended (e.g., more than recommended) trail cable lengths that represent a relatively high impedance seen by the drive system. When one of the drives on the machine turns on its power bridge, the voltage applied to the drives can suddenly dip or notch. At times, this leads to sudden increase in a silicon-controlled rectifier (SCR) dv/dt rating, which indicates the rate of voltage change with respect to time. The model aids in the identification of conditions that lead to inversion faults. In many cases the model allows for corrective action to take place prior to these faults occurring. For instance, the disclosed model assists, for example, with explaining such dips when they are logged. The model also assists with diagnosing the root cause of the dip quickly and reliably based on continuous data collection, thereby helping to understand any potential short and long term damage to motors and brakes. The model also assists with correcting trail cable length, optimizing load distribution, and pointing out when voltage regulation has or will become an issue with the operation of a machine 128.

A third example includes a DC bus over volts model that detects premature failing of a machine 128 drives' add-on capacitor modules caused by repeated DC Bus over voltage events. The model, for example, captures TripRite DC Bus Over Voltage, which is one of the key trigger points for drive fault alarms. The model also captures and reports a higher frequency of drive fault alarms that can prevent premature failure of a drives' add-on capacitor modules.

A fourth example includes a crowd belt slippage model. The crowd belt slippage model is configured to detect an instantaneous change in the relative speed between a crowd motor drive end and a first reduction shaft of a crowd gear system. The speed of the first reduction shaft is calculated from crowd resolver counts, which can be used for calculations such as crowd torque. Crowd slippage events are effectively calculated by monitoring crowd motor speed and crowd resolver counts in order to identify an anomaly and notify a user when there is a sudden decrease in the resolver counts. Frequent belt slippage is a major indicator of a crowd belt being too loose. The model facilitates frequently monitoring crowd belt slippage and correcting pressure limits for auto-tensioning system, and can be used as a precursor for crowd belt wear out and to estimate downtime for premature crowd belt tensioning, thereby potentially avoiding unsafe machine conditions.

A fifth example includes a crowd temperature model. The crowd temperature model is configured to predict and monitor bearing failures using current event data 118. The model accounts for the affects of ambient temperature in a field environment on a machine 128 in assessing whether to identify an anomaly when bearing temperature reaches a certain temperature, such as 80 degrees Celsius, and suggest shutting down the machine 128 when the bearing temperature reaches another specific temperature, such as 90 degrees Celsius. The model facilitates identifying crowd bearing failures before they occur, as well as monitoring the life cycle of a bearing.

Returning to the workflow 2010, if it is decided in decision step 2016 that an anomaly does exist (e.g., using the models or anomaly detection techniques described above), then an alert comprising information on the anomaly is generated in step 2018. In certain aspects, an anomaly alert is generated if the associated machine data 118 is determined to be differentiable (e.g., can be differentiated from other event data for the same or related machines), anomalous (e.g., is anomalous from other event data for the same or related machines), repeatable (e.g., the results of the data analysis can be repeated), and timely (e.g., a response to the anomaly alert can be initiated with sufficient time to address the alert). The alert can be transmitted to a user, such as by telephone call, voice notification, electronic message, text message, or instant message. The workflow 2010 ends after steps 2018 and 2022.

Figure 22:
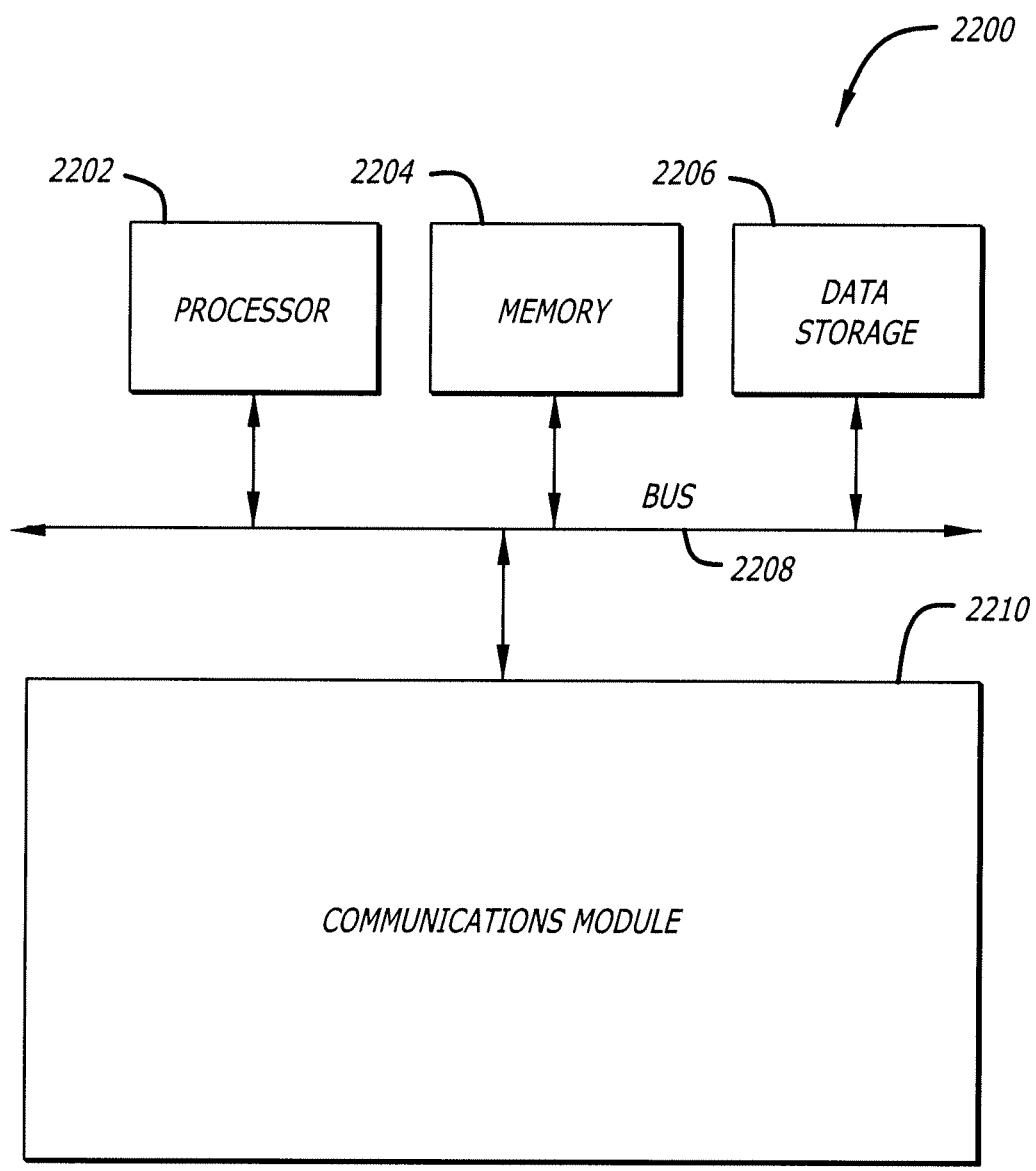
FIG. 22 is a block diagram illustrating an example of a computer system with which the system of FIG. 1A can be implemented.

FIG. 22 is a block diagram illustrating an example of a computer system 2200 with which the server system 100 of FIG. 1A can be implemented. In certain embodiments, the computer system 2200 may be implemented using software, hardware, or a combination of both, either in a dedicated server, or integrated into another entity, or distributed across multiple entities.

Computer system 2200 (e.g., system 100 of FIG. 1) includes a bus 2208 or other communication mechanism for communicating information, and a processor 2202 (e.g., processor 104 from FIG. 1) coupled with bus 2208 for processing information. By way of example, the computer system 2200 may be implemented with one or more processors 2202. Processor 2202 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. Computer system 2200 also includes a memory 2204 (e.g., memory 106 from FIG. 1), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 2208 for storing information and instructions to be executed by processor 2202. The instructions may be implemented according to any method well known to those of skill in the art, including, but not limited to, computer languages such as data-oriented languages (e.g., SQL, dBase), system languages (e.g., C, Objective-C, C++, Assembly), architectural languages (e.g., Java), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 2204 may also be used for storing temporary variable or other intermediate information during execution of instructions to be executed by processor 2202. Computer system 2200 further includes a data storage device 2206, such as a magnetic disk or optical disk, coupled to bus 2208 for storing information and instructions.

According to one aspect of the present disclosure, a system for remotely monitoring machines can be implemented using a computer system 2200 in response to processor 2202 executing one or more sequences of one or more instructions contained in memory 2204. Such instructions may be read into memory 2204 from another machine-readable medium, such as data storage device 2206. Execution of the sequences of instructions contained in main memory 2204 causes processor 2202 to perform the process steps described herein. One or more processors in a multi-processing arrangement may also be employed to execute the sequences of instructions contained in memory 2204. In alternative embodiments, hard-wired circuitry may be used in place of or in combination with software instructions to implement various embodiments of the present disclosure. Thus, embodiments of the present disclosure are not limited to any specific combination of hardware circuitry and software.

The term "machine-readable medium" as used herein refers to any medium or media that participates in providing instructions to processor 2202 for execution. Such a medium may take many forms, including, but not limited to, non-volatile media, volatile media, and transmission media. Non-volatile media include, for example, optical or magnetic disks, such as data storage device 2206. Volatile media include dynamic memory, such as memory 2204. Transmission media include coaxial cables, copper wire, and fiber optics, including the wires that comprise bus 2208. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

While certain aspects and embodiments of the invention have been described, these have been presented by way of example only, and are not intended to limit the scope of the invention. Indeed, the novel methods and systems described herein may be embodied in a variety of other forms without departing from the spirit thereof. The accompanying claims and their equivalents are intended to cover such forms or modifications as would fall within the scope and spirit of the invention.

What is claimed is:

1. A method of predicting a failure of a crowd system of a mining machine, the method comprising:
    driving, by a crowd motor, a crowd belt via a drive shaft, the drive shaft having a crowd motor drive end and a non-drive end;
    receiving, by a processor, a speed of the drive shaft at the crowd motor drive end;
    receiving, by the processor, a speed for a reduction shaft of the crowd system;
    comparing, by the processor, the speed of the drive end of the drive shaft to the speed of the reduction shaft; and
    generating an alert indicating an anomaly of the crowd belt based on the comparison.

2. The method of claim 1, wherein the speed of the reduction shaft is calculated from crowd resolver counts.

3. The method of claim 2, wherein the alert indicating an anomaly is generated by a decrease in the resolver counts.

4. The method of claim 3, wherein the alert indicates crowd belt slippage.

5. The method of claim 4, wherein frequent crowd belt slippage indicates crowd belt wear out.

6. A method of predicting a failure of a crowd system of a mining machine, the method comprising:
    driving, by a crowd motor, a crowd belt via a drive shaft, the drive shaft having a drive end and a non-drive end;
    receiving, by a processor, a temperature for the drive end of the drive shaft;
    receiving, by the processor, a temperature for the non-drive end of the drive shaft;
    comparing the temperature for the drive end of the drive shaft with the temperature for the non-drive end of the drive shaft; and
    generating an alert when there is a raise in the temperature at the drive end of the drive shaft relative to the non-drive end of the drive shaft.

7. The method of claim 6, wherein the temperature of the drive end is a drive end bearing temperature and wherein the temperature at the non-drive end is a non-drive end bearing temperature.

8. The method of claim 7, wherein the alert indicates that the crowd belt is over-tensioned.

9. The method of claim 7, wherein the alert indicates that the drive shaft is not properly aligned.

10. A system for predicting a failure of a crowd system, the system comprising:
    a mining machine having a crowd motor that drives a drive shaft and having a crowd belt driven by the drive shaft, the drive shaft having a drive end and a non-drive end;
    sensors for speed on the mining machine; and
    a processor coupled to the sensors, the processor configured to
        receive a speed for the drive end of the drive shaft,
        receive a speed of a reduction shaft of the crowd system,
        compare the speed of the drive end of the drive shaft to the speed of the reduction shaft, and generate an alert indicating an anomaly of the crowd belt based on the comparison.

11. The system of claim 10, wherein the speed of the reduction shaft is calculated from resolver counts.

12. The system of claim 11, wherein the alert indicating an anomaly is generated by a decrease in the resolver counts.

13. The system of claim 12, wherein the processor generates the alert to indicate crowd belt slippage.

14. The system of claim 13, wherein frequent crowd belt slippage indicates crowd belt wear out.

15. A system for predicting a failure of a crowd system, the system comprising:
- a mining machine having a crowd motor that drives a drive shaft and having a crowd belt driven by the drive shaft, the drive shaft having a drive end and a non-drive end;
- sensors for temperature provided on the mining machine; and
- a processor coupled to the sensors, the processor configured to
  - receive a temperature for the drive end of the drive shaft;
  - receive a temperature for the non-drive end of the drive shaft;
  - compare the temperature for the drive end of the drive shaft with temperature for the non-drive end of the drive shaft; and
  - generate an alert indicating an anomaly of the crowd belt based on the comparison.

16. The system of claim 15, wherein the temperature of the drive end is a drive end bearing temperature and wherein the temperature at the non-drive end is a non-drive end bearing temperature.

17. The system of claim 16, wherein the alert indicates that the crowd belt is over-tensioned.

18. The system of claim 16, wherein the alert indicates that the drive shaft is not properly aligned.

* * * * *